United States Patent
Kraft

[11] Patent Number: 5,947,416
[45] Date of Patent: Sep. 7, 1999

[54] FLOOR RISING CABIN TABLE

[75] Inventor: John R. Kraft, Rose Hill, Kans.

[73] Assignee: Raytheon Aircraft Corporation, Lexington, Mass.

[21] Appl. No.: 09/073,665

[22] Filed: May 4, 1998

[51] Int. Cl.[6] .............................. B64D 11/00; B60N 3/12; A47B 23/00; A47B 11/00

[52] U.S. Cl. .................................. 244/118.5; 296/37.14; 108/42; 108/143

[58] Field of Search ............................. 244/118.5, 118.6, 244/129.1; 296/37.14, 24.1, 156, 164; 108/42, 143

[56] References Cited

U.S. PATENT DOCUMENTS

| | | | |
|---|---|---|---|
| 928,726 | 7/1909 | Whitthaus | 108/42 |
| 2,509,332 | 5/1950 | Budd | 108/60 |
| 2,676,858 | 4/1954 | Duncan | 108/78 |
| 2,731,317 | 1/1956 | Duncan | 108/142 |
| 3,659,894 | 5/1972 | Dodgen | 296/37.14 |
| 3,880,458 | 4/1975 | Jackson | 296/164 |
| 4,019,443 | 4/1977 | Jones | 108/137 |
| 4,130,070 | 12/1978 | Herrin | 108/143 |
| 4,620,741 | 11/1986 | Hanemaayer | 296/37.14 |
| 5,031,563 | 7/1991 | Matre | 296/24.1 |
| 5,069,142 | 12/1991 | Matre | 108/42 |

OTHER PUBLICATIONS

Still–frame photograph taken from the video tape—Silicon Graphics, Inc. submitted as reference C1 on Aug. 14, 1998.

Primary Examiner—Charles T. Jordan
Assistant Examiner—Theresa M. Wesson
Attorney, Agent, or Firm—Arnold White & Durkee

[57] ABSTRACT

A rising table assembly including an extension assembly and tabletop. The table may be stowable beneath a floor surface. The table assembly is typically extendible through an opening in the floor surface to a position above the floor. A set of closure doors may be provided to act as a floor surface when the table assembly is in stowed position beneath the floor. The table assembly is particularly suitable for use in vehicles such as aircraft, trains, motor homes, or boats. The table assembly may be of use in other situations where space is a premium.

29 Claims, 14 Drawing Sheets

SECTION A-A

SECTION B-B

SECTION C-C

FLOOR RISING CABIN TABLE

BACKGROUND OF THE INVENTION

1. Field of the Invention

This invention relates generally to storable tables and, more specifically, to storable tables for use in cabins of vehicles. In particular this invention relates to extendible or rising tables that are storable beneath the floor of a vehicle cabin, such as an aircraft cabin.

2. Description of the Related Art

Cabins or interiors of aircraft and other passenger vehicles typically are provided with tables for passenger convenience. These tables are typically oriented in a manner complimentary with passenger seating such that the table surface may be used to facilitate activities such as dining, paper work, game-playing, etc.

In one common configuration typically employed in aircraft interiors, a cabin table is typically mounted to the sidewall of the cabin. Such a sidewall mounted table is designed to be raised from a stowed position adjacent the sidewall of the cabin, and to be lowered toward the centerline of the cabin to provide a working surface. In such configurations, a table when in lowered position is typically cantilevered away from the sidewall to prevent interference with the passenger's legs and feet. Because such tables are typically configured to extend a sufficient distance away from the cabin sidewall so as to provide a working surface for adjacent passenger sitting areas, a lengthy and unsupported overhanging table section is typically created. Such unsupported cantilevered tables therefore typically flex or bend, and are sometimes damaged, when loads are applied to the table. This is especially true when a load is applied toward the free and unsupported end of the table. To address the potential for table damage inherent in cantilevered table designs, special design features are typically incorporated to prevent damage to a table when it is overloaded. For example, break-away table mounts, such as rubber shear mounts, are typically employed to induce an overload failure at a point that is easily repairable.

In a typical sidewall stowable mounting installation, a storable cabin table is designed to be pulled upward for removal from a sidewall storage area. When installed in an aircraft cabin, such a configuration typically requires a design which takes into consideration the upper curvature of the cabin so that the table does not hit the upper part of the air frame or cabin interior when the table is transitioned from the stowed position to the deployed or unstowed position. Typically, this means the guide mechanisms for the table tracks and pivots are somewhat complicated.

One or more storable tables may be employed to work together. In one common configuration, two sidewall stowable tables may be mounted on opposite sides of a vehicle cabin so that they may be raised and lowered in such a way to meet along the cabin centerline, forming a substantially continuous work surface across the width of the cabin interior. Such a two-table configuration is convenient, for example, when passengers wish to play cards, unroll blueprints or perform other tasks that are facilitated by a substantially uninterrupted work area across the center of the cabin. However, pressurized aircraft cabins typically expand slightly when pressurized in flight. Such expansion may cause a gap to form along the mating surface of opposing sidewall mounted cabin tables during pressurized flight. Such a gap may disrupt the continuity of the work surface and/or may be somewhat disconcerting to an observant passenger.

Still another disadvantage of sidewall-mounted cabin tables is that such tables typically must be mounted inboard of the cabin structure or wall. This mounting characteristic takes space from the passenger cabin, typically in the important area of knee room. To reduce the amount of knee room taken up by the side mounted table, such tables are typically designed to be as thin as possible, reducing the strength and the rigidity of the table surface. Furthermore, even such thin inboard-mounted table designs take up valuable space from the passenger envelope of the cabin. This intrusion on passenger space takes place when the table is stowed or deployed as the table support assembly remains attached to the sidewall. Besides reducing space for passenger comfort, some sidewall mounted table installations may also intrude into the space required for clearance of crash dummies during FAA dynamic crash condition testing, resulting in test failure. In addition, sidewall mounted tables may impose on space normally used for routing of aircraft systems, such as wiring, plumbing, heat and air conditioning ducts. Sidewall mounted tables typically interrupt the routing of these systems, increasing installation time as well as adding weight due to additional material and components required to route systems around such tables.

Besides concerns related to consumption of space and lack of strength, other problems also exist with conventional sidewall mounted storable cabin tables. For example, when in deployed position, sidewall mounted tables typically impinge or interfere with aisle clearance. In such a case, a passenger wishing to travel down the aisle typically must ask the table user to fold all or portion of the table (such as an inboard table leaf) out of the way to allow passage. Furthermore, because sidewall mounted storable cabin tables typically fold out from the cabin sidewall directly in front of a passenger, there is usually no other option but to orient the deployed table directly over the passenger's lap. Because FAA requirements for takeoff and landing require a minimum aisle width for safety, passenger seats are typically placed against the cabin sidewall where shoulder and head room space is at a premium. After takeoff, many aircraft cabins offer seats that laterally track to move away from the sidewall to provide added room for the passenger. However, this feature tends to move aircraft passengers away from the deployed sidewall mounted cabin table.

SUMMARY OF THE INVENTION

In one respect, this invention is a floor rising table assembly, including a tabletop and an extension assembly coupled to the tabletop. The extension assembly is adjustable between a stowed position and an extended position so that the tabletop is disposed beneath or adjacent a floor surface when the extension assembly is in the stowed position, and so that the tabletop is disposed at a greater distance above the floor surface when the extension assembly is in the extended position than when the tabletop is in the stowed position. The tabletop may include a center section and at least one side piece, the side piece being extendably attached to the center section. The tabletop may be movably coupled to the extension assembly. The extension assembly may be an automated extension mechanism.

In another respect, this invention is a vehicle-mounted rising table assembly, including a tabletop and an extension assembly coupled to the tabletop. The extension assembly has a first end and a second end, with the first end of the extension assembly being coupled to the tabletop, and the second end of the extension assembly being coupled to the vehicle at a point adjacent or beneath a floor of the vehicle. The extension assembly is typically adjustable between a stowed position and an extended position so that the tabletop is disposed beneath or adjacent the floor when the extension assembly is in the stowed position, and so that the tabletop is disposed at a greater distance above the floor when the extension assembly is in the extended position than when the tabletop is in the stowed position. The vehicle floor may have an opening adapted to receive the tabletop; wherein the tabletop is adapted to be disposed beneath the floor when the extension assembly is in the stowed position; and wherein an upper surface of the tabletop is disposed adjacent to, and in substantially the same plane as, the vehicle floor when the extension assembly is in the stowed position, such that the tabletop upper surface is adapted to serve as a portion of the floor when the extension assembly is in the stowed position. The assembly may further include at least one closure door movable in relation to the vehicle floor, the closure door adapted to cover the opening in the vehicle floor when the extension assembly is in the respective stowed and extended positions, and wherein the closure door is further adapted to open to allow the tabletop to pass through the opening in the vehicle floor when the extension assembly is in a position intermediate between the extended and stowed positions. The closure door may be further adapted to close around the extension assembly after the tabletop has passed through the opening in the vehicle floor; and wherein a pedestal opening is defined in the closure door, the cutout opening being located in the closure door and having shape and dimensions complementary to the extension assembly such that the extension assembly may be received in the cutout opening when the extension assembly is in extended position and the closure door is closed. The closure door may be hingeably connected to the floor and adapted to swing outwardly and upwardly to allow the tabletop to pass through the opening in the floor when the extension assembly is in a position intermediate between the extended and stowed positions. The tabletop may include a center section and at least one side piece, the side piece being extendably attached to the center section. The tabletop side piece may be movable between a first position in substantially cantilevered or extended relation with the tabletop center section, and a second position in substantially overlapping or integral relation with the tabletop center section; and wherein the tabletop has dimensions complementary to the opening in the vehicle floor so that the tabletop may be received through the opening when the at least one tabletop side piece is in the second position. The tabletop may be movably coupled to the extension assembly. The table assembly may further include an automatic centering mechanism adapted to automatically center the tabletop relative to the extension assembly just prior to movement of the extension assembly from the extended position to the stowed position. The extension assembly may be an automated extension mechanism.

In yet another respect, this invention is an aircraft cabin rising table assembly, including: a tabletop center section having an upper surface, a lower surface, and at least one edge; at least one tabletop side piece, the side piece having an upper surface, a lower surface, and at least one edge hingeably attached to the at least one edge of the center section; and an extendible support coupled between the tabletop and the aircraft, the extendible support having a first end, a second end, and a longitudinal axis, the first end of the extendible support being slidably coupled to the lower surface of the tabletop center section, and the second end of the extendible support being disposed at a point beneath a floor of the aircraft cabin. The extendible support is adjustable between a stowed position and an extended position so that the tabletop center section and the at least one side section are disposed beneath the cabin floor when the extendible extension assembly is in the stowed position, and so that the tabletop center section and at least one side section are disposed at a distance above the floor when the extendible support is in the extended position. The at least one tabletop side piece is hingeably movable between a first position in cantilevered relation with the at least one edge of the tabletop center section, and a second position in substantially overlapping relation with the first or second surfaces of the tabletop center section. The cabin floor has an opening adapted to receive the tabletop center and side sections through the cabin floor, and wherein the tabletop center section has dimensions complementary to the opening in the vehicle floor so that the tabletop center section and side sections may be received through the opening when the at least one tabletop side piece is in the second position, and wherein the tabletop center and side sections are adapted to be disposed beneath the floor when the extendible extension assembly is in the stowed position; and further including at least one closure door movable in relation to the vehicle floor, the closure door adapted to cover the opening in the vehicle floor when the extendible extension assembly is in the respective stowed and extended positions, and wherein the closure door is further adapted to open to allow the tabletop to pass through the opening in the vehicle floor when the extendible extension assembly is in a position intermediate between the extended and stowed positions. The tabletop center section is slidably adjustable in relation to the extendible extension assembly in a direction substantially perpendicular to the longitudinal axis of the extendible support. The closure door may be further adapted to close around the extension assembly after the tabletop has passed through the opening in the vehicle floor. A pedestal opening may be defined in the closure door, the pedestal opening being located in the closure door and having shape and dimensions complementary to the extension assembly such that the extension assembly may be received in the pedestal opening when the extension assembly is in extended position and the closure door is closed. The assembly may further include a cutout section having shape and dimensions complementary to the pedestal opening such that the cutout section may be received in the pedestal opening; the cutout section being movably connected to the closure door and adapted to be received in the pedestal opening when the extension assembly is in the stowed position and adapted to be removed from the pedestal opening when the extension assembly is in an extended position and the closure door is closed. The table assembly may be designed for placement in an aircraft cabin having at least two rows of exterior passenger seats separated by a center aisle, and so that the second end of the opening and the extendible extension assembly are positioned at a location between the at least two rows of exterior passenger seats and coincident with the center aisle. The tabletop center section may be slidably adjustable toward each of the exterior rows of passenger seats, and in a direction substantially perpendicular to the longitudinal axis of the aircraft cabin. The tabletop center section and at least one side section together may form a tabletop, and the extendible extension assembly may be positioned and configured such that when the extendible tabletop support is in the extended position, the upper surface of the tabletop is disposed in a complementary manner with at least one deployed sidewall stowable cabin table having an upper surface to form a substantially continuous tabletop upper surface. The extendible support may be an automated extension mechanism. The table assembly may further include an automatic centering mechanism adapted to automatically and slidably adjust the tabletop centered posit a substantially centered position relative to the extendible support just prior to automatic movement of the extension assembly from the extended position to the stowed position. The table assembly may be configured for use with an aircraft having a pressure vessel wall surrounding the cabin, and so that the second end of the extendible extension assembly is disposed at a point between the cabin floor and the pressure vessel wall. The assembly may also be configured for use with an aircraft having a pressure vessel wall surrounding the cabin and an underslung wing area disposed beneath the cabin, and such that the extendible extension assembly may extend through the pressure vessel wall so that the second end of the extendible extension assembly is disposed at a point in the underslung wing area The automated extension mechanism may be a pneumatic actuated cylinder.

DESCRIPTION OF ILLUSTRATIVE EMBODIMENTS

Figure 1:
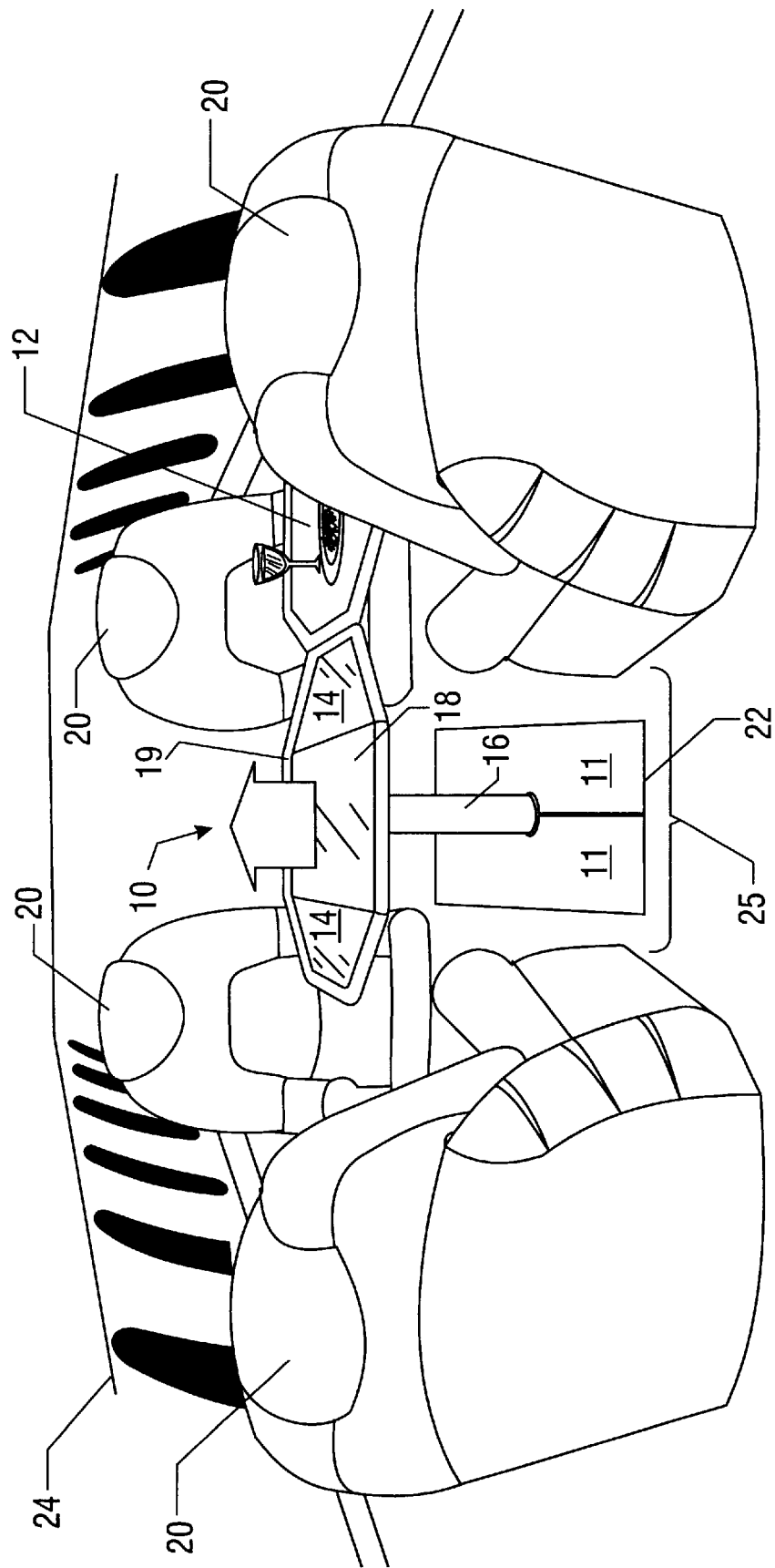
FIG. 1 shows a simplified isometric view of one embodiment of the disclosed floor rising table, shown here in use with a club seating arrangement within an aircraft cabin.

Embodiments of the disclosed floor rising table may be configured and installed in a variety of ways. Typically, a floor rising table is installed in a vehicle cabin, and most typically in an aircraft cabin. However, benefits of the disclosed floor rising table may be realized in non-vehicle applications, including any applications where space is at a premium. When installed in a vehicle cabin, the disclosed floor rising table is typically configured to be positionable between at least two positions, a stowed position (typically partially or completely beneath the floor of a vehicle cabin), and an extended or deployed position in which the table extends upwardly into the vehicle cabin interior in a direction away from the vehicle cabin floor. Advantageously, in one embodiment the ability to stow the table beneath the cabin floor when not in use provides maximum interior passenger space, without intrusion of bulky sidewall storage areas into the cabin interior area, such as is typically the case with sidewall storable cabin tables. Moreover, the disclosed floor rising cabin table may be configured with one or more supports directly beneath the center of the table surface, thereby providing much greater stability and strength in the deployed position than a conventional cantilevered side storable cabin table.

The disclosed floor rising cabin table design may be employed in a number of ways to provide a variety of table configurations. For example, in one embodiment the disclosed floor rising table may be configured to provide a deployed table surface that, unlike typical conventional storable table designs, may be positioned adjacent a passenger without being directly in the passenger's lap. Such a table position may be desirable, for example, when a passenger wishes to have a briefcase open and available for use at tabletop height, but not placed directly in front of the passenger. In other embodiments, the disclosed floor rising cabin table may be provided with a tabletop having folding or detachable side pieces (such as table leaves) to provide a variable sized work surface and/or to reduce the storage area required. A tabletop may also be slidably mounted, for example in track configuration, on a pedestal support so that that the tabletop may be moved sideways and/or back and forth in relation to the pedestal. Such a mounting configuration may be used to provide a tabletop that may be moved sideways or horizontally to allow passenger aisle passage or to allow selective use by passengers on only one side of a cabin. In other embodiments, the disclosed floor rising cabin table may be used to work in conjunction or cooperation with sidewall storable cabin tables. When not in use, the disclosed floor rising cabin table may be stowed out of the way beneath the floor of a cabin or, alternatively in a position disposed adjacent the floor, thus maximizing the amount of space available for passenger comfort. As used herein, "disposed adjacent" a cabin floor means that a tabletop is disposed closer to a cabin floor when in stowed position than when in extended position, including beneath, above or even with a cabin floor.

The disclosed floor rising cabin table may be employed in, among other things, any vehicle having a cabin suitable for carrying passengers and having sufficient room for complete or partial table storage beneath a cabin floor. Typically, a floor rising cabin table is employed in commercial transportation applications where space is at a premium and/or passengers are situated closely to each other. Examples of typical cabin applications include, but are not limited to, the cabins of aircraft, trains, motorhomes, over-road bus conversions, boats, etc. As used herein, "cabin floor" means any covering or other partition completely or partially separating the passenger space of a vehicle cabin from another area beneath the passenger space. In this regard, a cabin floor may be constructed of any suitable partitioning material including, but not limited to, metal, expanded metal, wood, plastic, fiberglass, composite materials, etc.

In the embodiment illustrated in FIG. 1, a floor rising cabin table 10 is typically located near the center of a vehicle cabin 24 as shown. In this regard, table 10 may be configured for use as a stand-alone unit and/or for use in conjunction with sidewall storable cabin tables 12 as shown in FIG. 1. Advantageously, when used in conjunction with sidewall tables 12 the tabletops of tables 10 and 12 may be arranged in such a way as to provide a continuous work surface across the width of the cabin, if so desired. Alternatively, floor rising table 10 may be used alone or in conjunction with only one sidewall storable table 12. When a floor rising cabin table 10 is used as a stand-alone table sidewall storable cabin tables 12 may be eliminated entirely, thereby saving weight and removing obstructions to passenger space and systems, such as electrical routing down the side of the cabin. When employed alone, a rising cabin table 10 is typically lighter than the combined weight of two sidewall stowable cabin tables 12.

More specifically, FIG. 1 illustrates one possible application of a rising cabin table 10 mounted in an aircraft cabin having four cabin seats 20 arranged in a club arrangement which consists of two aft facing seats and two forward facing seats. Such seats are typically equipped with forward and aft tracking, as well as swivel capabilities. Such a seating arrangement may be found, for example, in an aircraft having a six passenger seat configuration. As shown, table 10 may be positioned in a central location in relation to the passenger seats 20. However, it will be understood with benefit of this disclosure that embodiments of the disclosed floor rising cabin table may be employed with other cabin seating configurations and/or located in off center locations within a cabin. Furthermore, more than one floor rising cabin table assembly may be present within a single cabin, and in such cases the tables may be configured to cooperate or to operate independently of each other.

As shown in FIG. 1, floor rising cabin table 10 may be provided with a tabletop assembly 19 comprising a center section 18. An extension assembly or extendible table support comprising a pedestal support 16 is typically provided for extending and supporting tabletop 19, although any other type of support or combination of support types suitable for supporting a tabletop may also be employed. In the embodiment shown in FIG. 1, floor rising cabin table 10 is configured to extend and cooperatively engage side storable cabin table 12. In this regard, it will be understood with benefit of this disclosure that a side storable cabin table 12 may be provided on one or both sides of a cabin as so desired. In other cases, no side storable cabin tables may be present As shown, floor rising cabin table 10 may also be configured with optional extendable or movable side pieces, in this case non-integral folding side pieces comprising two folding table leaves 14 hingeably attached so as to unfold from opposite sides of center section 18. Although not necessary, folding leaves 14 advantageously may be unfolded to provide a larger working surface when table 10 is extended or deployed, and may be folded inward so that table 10 requires a reduced storage area beneath the floor of the cabin when in stowed position.

Although one configuration of a floor rising cabin table is depicted in FIG. 1, it will be understood that a variety of table sizes and shapes, as well as cabin installations may be employed. For example, a floor rising cabin table may be of any shape suitable for forming a working surface including, but not limited to, round, oval, square, irregular, etc. Furthermore, a floor rising cabin table may be configured with any extendable or movable side piece configuration extendably attached to a table center section so as to be suitable for extending or increasing the surface area of a tabletop. For example, a tabletop may have no folding table leaves, one folding leaf on one table side, or any number of folding leaves on one or multiple sides of a tabletop. Also possible are multilevel folding leaves (ie., table leaves that fold at multiple points), integral side pieces (such as sliding table leaves which may be extended from a tabletop in a lateral rather than folding direction), non-integral separate table leaves that may be attached to a tabletop once the table is deployed, etc.

Although it will be understood that a floor rising cabin table is typically located in a central area of a cabin having at least two rows of exterior passenger seats separated by a center aisle, such as a in a location coincident cabin aisle 25 as shown in FIG. 1, any other location in the cabin that is suitable for partially or completely storing a cabin table beneath the cabin floor may be possible. In addition, more than one floor rising cabin table may be used in one cabin area. For example, in relatively small diameter aircraft cabins such as that shown in FIG. 1, multiple rising cabin tables may be positioned at varying locations in the center aisle as so desired. In relatively wider diameter cabins, such as in larger commercial aircraft cabins, multiple rising cabin tables may be provided at varying locations across the cabin width.

Still referring to FIG. 1, floor rising cabin table 10 is shown positioned along the approximate center line of aircraft cabin 24, and is substantially centered within the forward club arrangement. In FIG. 1, table 10 is shown in elevated or deployed position and comprises tabletop assembly 19 comprising a center section 18 and two folding table leaves 14. Center section 18 is shown connected or coupled to pedestal support 16. In this case, floor rising table 10 is designed to be stored beneath cabin floor 22 with table leaves 14 folded inward, although alternate designs are possible. The stored space beneath the cabin floor may vary depending on vehicle type and design. In the case of the embodiment shown in FIG. 1, cabin 10 may be mounted in, for example, an aircraft having an underslung wing projecting about 18 inches below the constant section of the airframe. Such a wing space may be utilized to provide room for storage of floor rising table 10. Floor rising table 10 may be designed to rise from cabin floor 22 when activated by any suitable switching or triggering mechanism or device. For example, an electrical switch may be located on the sidewall of the passenger cabin which controls or activates, for example, an electric motor or a solenoid or relay which may control hydraulic or pneumatic operated mechanisms for raising the table. In another embodiment, table extension may be activated by a remote control device (such as a handheld remote control) which may allow table activation from anywhere within the cabin. Such remote control devices are well known in the art and function, for example, via infrared, radio frequency, etc.

When table 10 is activated, it rises from cabin floor 22 upon support 16 by means of an extension actuator or mechanism which may comprise an automated assembly, for example electrical, pneumatic, mechanical, electromechanical actuators as described elsewhere herein. Alternatively, a manual actuated assembly or mechanism (such as hand operated hydraulic, pneumatic, mechanical worm gear, etc. mechanisms) may also be employed. In the embodiment of FIG. 1, rising cabin table 10 is typically provided with a set of optional closure doors 11 which serve the dual purpose of providing a cabin floor surface and of covering stowed table 10 when table 10 is in its stowed position. In this regard, closure doors 11 are typically designed to support typical floor loads, although this is not necessary. Movement of closure doors 11 is typically sequenced with movement of table assembly 10. In the embodiment of FIG. 1, sufficient clearance to allow rising cabin table 10 to move upward between cabin chairs is provided by folded table leaves 14. When table 10 reaches its deployed or extended position, table leaves 14 may be unfolded to create a larger working surface.

As may be seen in FIG. 1, when floor rising cabin table 10 is in deployed or extended position, tabletop 19 is situated in the approximate center of the club arrangement. When table 10 is employed with such a club seating arrangement, each of the club seats 20 may be provided to pivot toward, and/or track toward tabletop 19. With optional folding table leaves 14 unfolded, tabletop 19 provides a relatively large surface well suited for passenger use. As such, it is typically ideal for card playing, serving of food, unrolling blueprints, etc. Advantageously because tabletop 19 is supported from the bottom and near the center by support pedestal 16, tabletop 19 is relatively stable, with no cantilevered instability typically found in conventional sidewall storable cabin tables.

Figure 2:
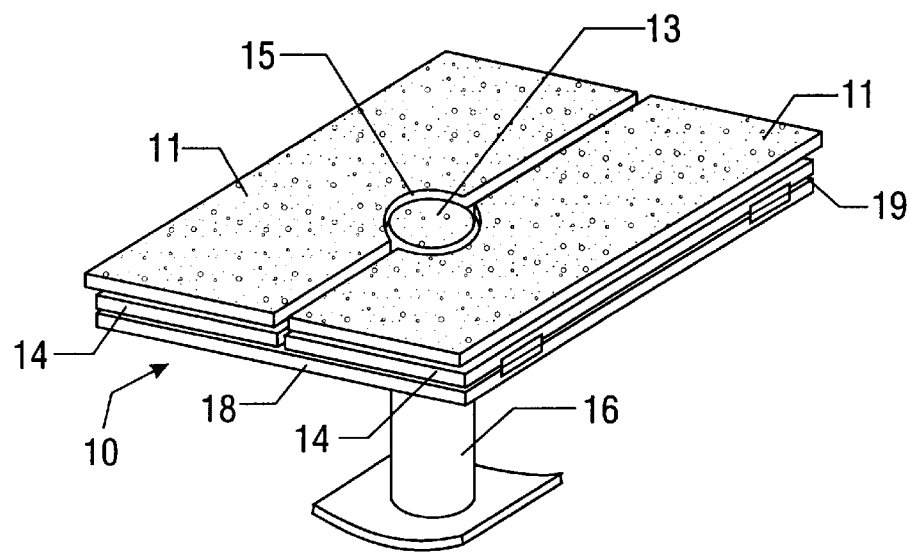
FIG. 2 shows a simplified isometric view of one embodiment of the disclosed floor rising table, shown in collapsed or stowed position with optional table leaves folded inward and covered by closure doors.
Figure 3:
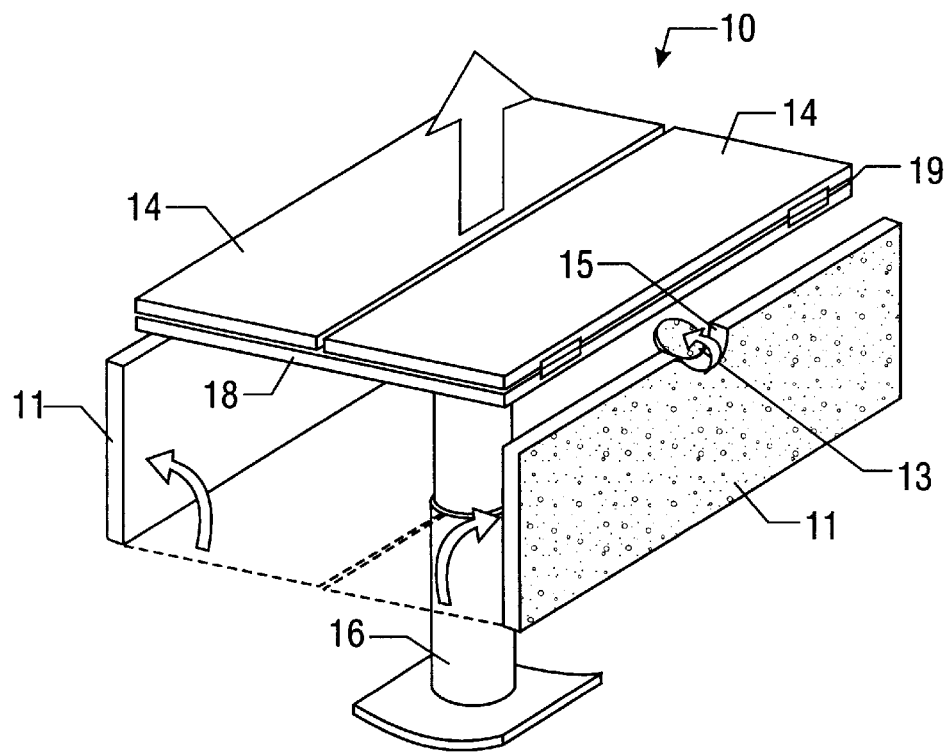
FIG. 3 is a simplified perspective view of one embodiment of the disclosed floor rising table of the floor rising cabin table of FIG. 2 shown in rising position between open closure doors.
Figure 4:
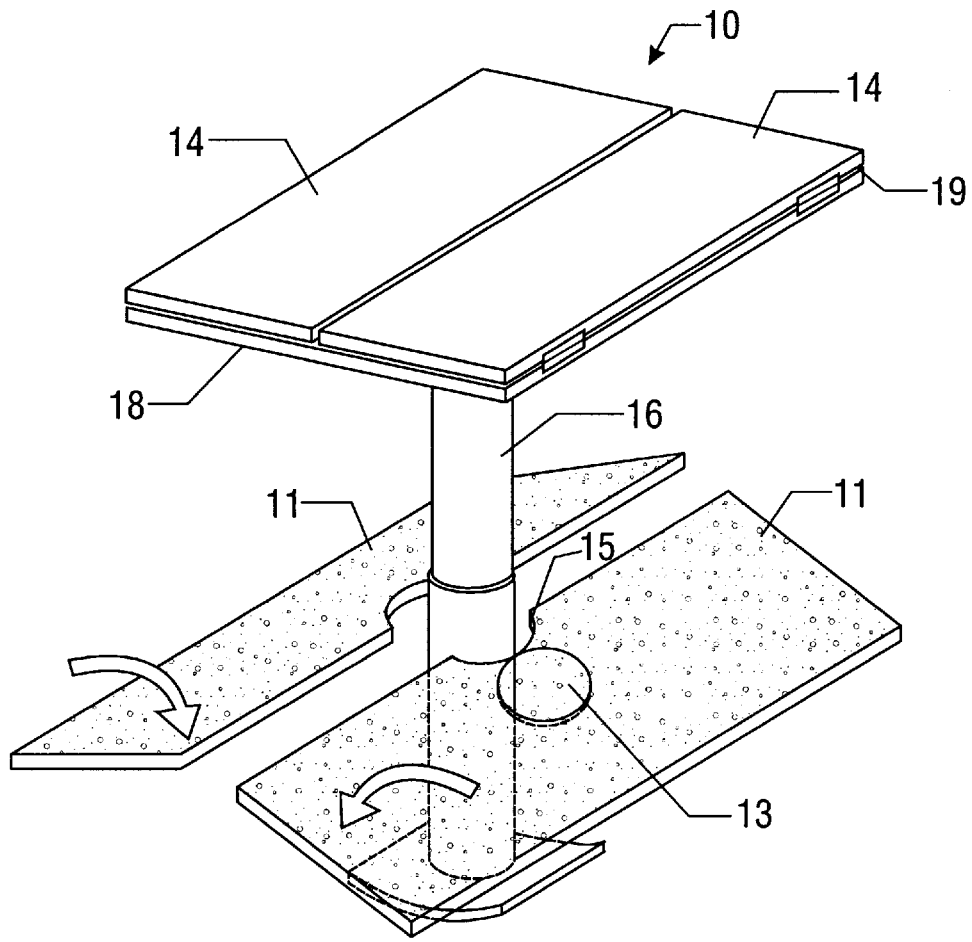
FIG. 4 is a simplified perspective view of one embodiment of the disclosed floor rising table shown with closure doors closing around its pedestal base.
Figure 5:
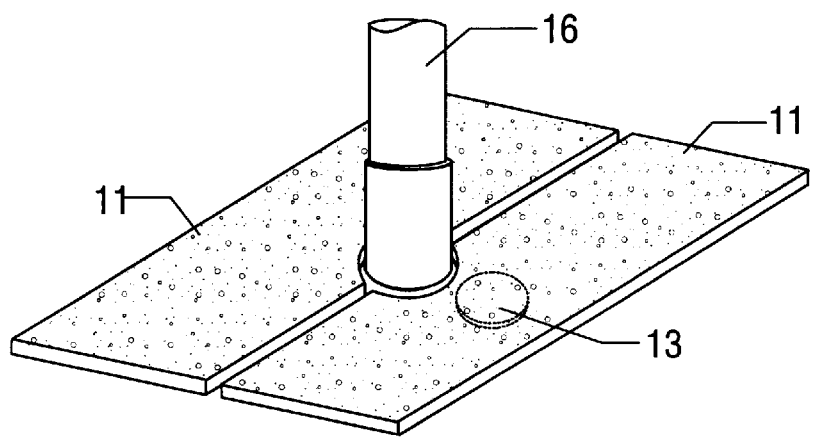
FIG. 5 is a simplified partial perspective view of one embodiment of the disclosed floor rising table in extended or deployed position with closure doors closed around the table pedestal support.

FIGS. 2–5 illustrate how closure doors 11 may be sequenced with movement of table assembly 10 in just one exemplary embodiment. In this regard, FIGS. 2–5 show table 10 and closure doors 11 with the remainder of the cabin floor omitted for clarity. FIG. 2 illustrates one embodiment of closure doors 11 with pedestal opening 15 having a shape and dimension complementary to pedestal support 16 and cutout section 13 having a shape and dimension complementary to opening 15. FIG. 2 shows table 10 in stowed position, with table leaves 14 folded inward. In this position, table 10 is covered by closure doors 11 and cutout 13. As shown in FIG. 3, when activated for deployment rising cabin table 10 begins rising and thereby moves closure doors 11 open in order to let table 10 rise to its desired extended position which is typically about 28 to about 30 inches above the floor, but may be any other desired height as well. As shown in FIG. 2, cutout 13 is typically movably attached to one door of closure doors 11 such that it moves out of position leaving a pedestal opening 15. As shown in FIG. 4, as table 10 continues its upward movement, doors 11 are allowed to close around support pedestal 16 by virtue of opening 15 so as to provide a flat floor beneath table 10 for, among other things, passenger foot room. FIG. 5 illustrates how closure doors 11 fit around pedestal support 16 when table 10 is in extended position. In this embodiment, clearance of doors 11 to pedestal support 16 is accomplished by opening 15 and movable cutout 13.

With regard to opening 15 and cutout 13, it will be understood that an opening and/or cutout may be configured in one or both doors in any manner suitable for providing an opening for a table or pedestal support to extend through when a table 10 is in an extended position and closure doors 11 are closed around the table or pedestal support 16. It will be further understood that cutout or plug 13 may be movably disposed on one or more closure doors 11 using any mechanism suitable for accomplishing the function of ceiling opening 15 when closure doors 11 are in closed position and of moving out of the way so that a table or pedestal support 16 may extend through opening 15 when a table 10 is in extended position and closure doors 11 are closed around support 16. For example, cutout 13 may be configured with a spring tension, automatic activated, or other suitable mechanism configured such that the mechanism causes cutout 13 to be positioned or otherwise placed in opening 15 when table 10 is in stowed position (as shown in FIG. 2), but which causes or allows cutout 13 to be displaced out of, or away from, opening 15 when table 10 is in deployed position (as shown in FIG. 5).

In one embodiment, cutout 13 may be provided with a hinge or hinge point which allows cutout 13 to move in a direction substantially parallel to, or alternatively perpendicular to, the plane of closure door 11 to which it is hingeably or movably attached. Alternatively, cutout 13 may be configured to retract or slide in a manner parallel to the plane of attached closure door 11, for example so that cutout 13 moves in and out of a recessed area in closure door 11, and/or adjacent to one side of closure door 11. In either case, cutout 13 is typically provided with a spring-loaded hinge or other mechanism that provides tension to cause cutout 13 to be biased into opening 15, but which is configured such that contact between cutout 13 and support 16 as doors 11 are closed around support 16 serves to displace cutout 13 from opening 15 as shown sequentially in FIGS. 3–5. When table 10 is moved back to stowed position, the reverse sequence of events occurs and sufficient spring strength is provided to place or position cutout 13 back into position within opening 15 as closure doors 11 are moved into horizontal position over tabletop 14. It will be understood with benefit of the present disclosure that although pedestal 16 and cutout 13 are shown to have complementary cross sections that are circular in shape, other shapes of pedestal 16 and/or cutout 13 are possible, including square, oval, irregular, etc.

A tabletop may be movably coupled to an extension assembly. For example, in the embodiment of FIG. 1, table 10 may be configured with optional side tracking assembly (as described elsewhere herein) which, in this case, allows tabletop 19 to track to either side of center aisle 25. Side tracking allows tabletop 19 to be moved closer to passengers seated on one side or the other of the cabin. Thus, tabletop 19 may be placed closer to a given two-person club seating arrangement for access without the need for tracking or moving cabin seats 20 toward tabletop 19. Side tracking also allows tabletop 19 to be moved toward one side or the other in order to allow passenger travel down the main aisle 25 of cabin 24. In this regard, when tabletop 19 of FIG. 1 is moved to one side and one side leaf 14 folded upwards, aisle travel is easily accomplished. When table 10 is configured with an optional side tracking assembly a latching mechanism is typically employed to allow tabletop 19 to selectively track to either side of center aisle 25.

Figure 6:
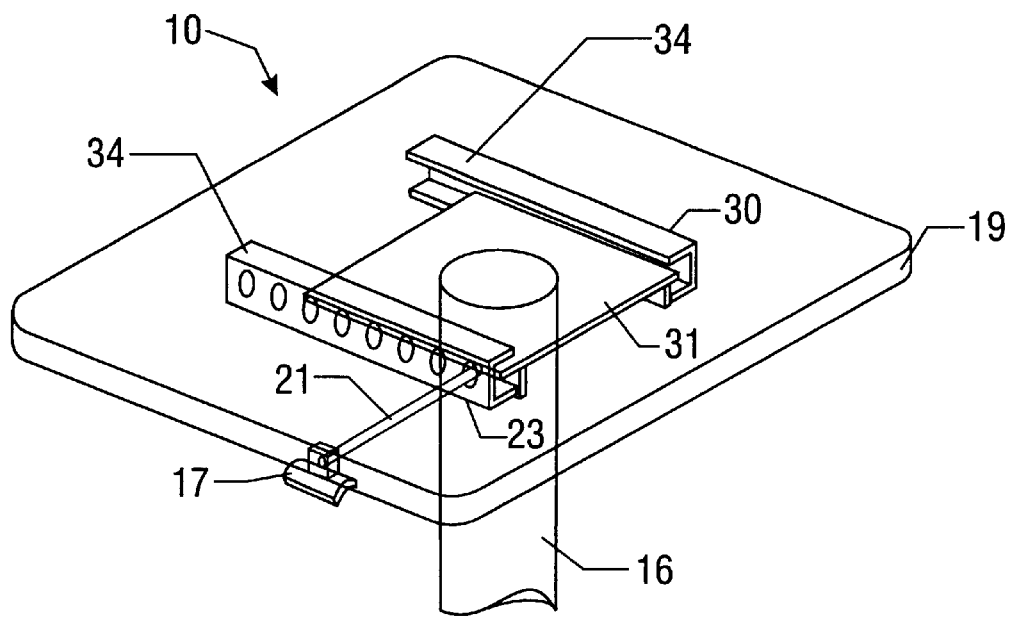
FIG. 6 is a simplified perspective view of one embodiment of the disclosed floor rising table showing a tabletop slide assembly and tabletop slide lock mechanism.
Figure 7:
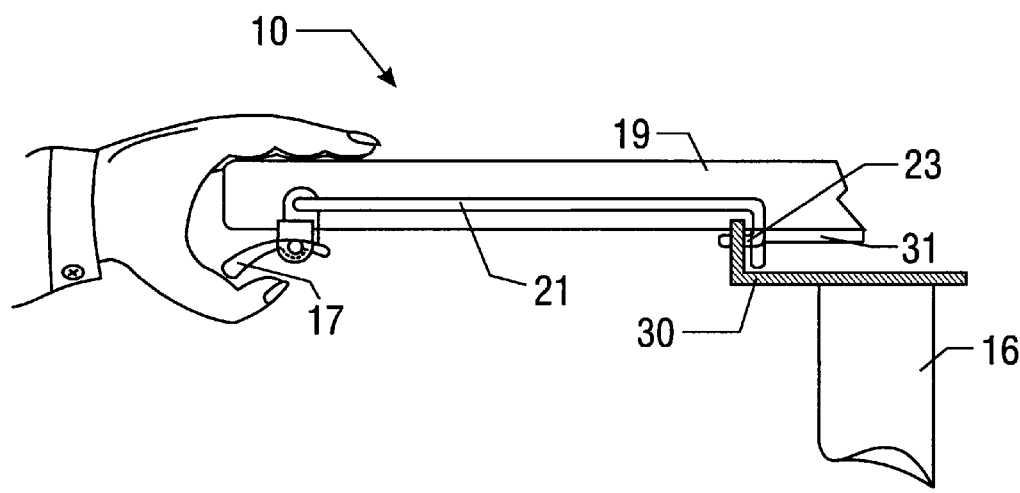
FIG. 7 is a simplified cross-sectional view of the floor rising cabin table of FIG. 6 showing a tabletop slide assembly and tabletop slide lock mechanism.

FIGS. 6 and 7 illustrate one exemplary embodiment of a floor rising cabin table 10 configured with a tabletop slide assembly or side tracking assembly 30 comprising a mounting bracket 31 connected to the top of pedestal 16. Tracking channels 34 are provided in the base of tabletop 19 to movably or slidably receive edges of mounting bracket 31. A release handle 17 is typically provided to operate the linkage 21 in such a way to actuate tabletop slide lock mechanism 23. Until actuated, tabletop slide lock 23 prevents movement of tabletop 19 in relation to 16 until moved to released or unlocked position by actuation of latch 17 to allow lateral movement of tabletop 19 in relation to pedestal 16. As shown, in this embodiment handle and latch 17 as well as linkage 21 and tabletop slide lock 23 are typically recessed as much as possible to prevent interference of passenger legs, although this is not necessary. It will be understood that although one exemplary embodiment of a tabletop slide assembly linkage and release handle are pictured in FIGS. 6 and 7, any other mechanism or combination of mechanisms suitable for locking and releasing a tabletop slide assembly may be employed.

Although a side tracking assembly similar to that described above is typically provided, it will be understood with benefit of the present disclosure that a table 10 may be configured with no side tracking assembly or alternatively with a tracking mechanism which allows moving tabletop 19 in directions other than side to side. For example, a table 10 may be configured with a tracking assembly configured to allow a tabletop 19 to track diagonally or front to back, and/or in more than one direction.

Figure 8:
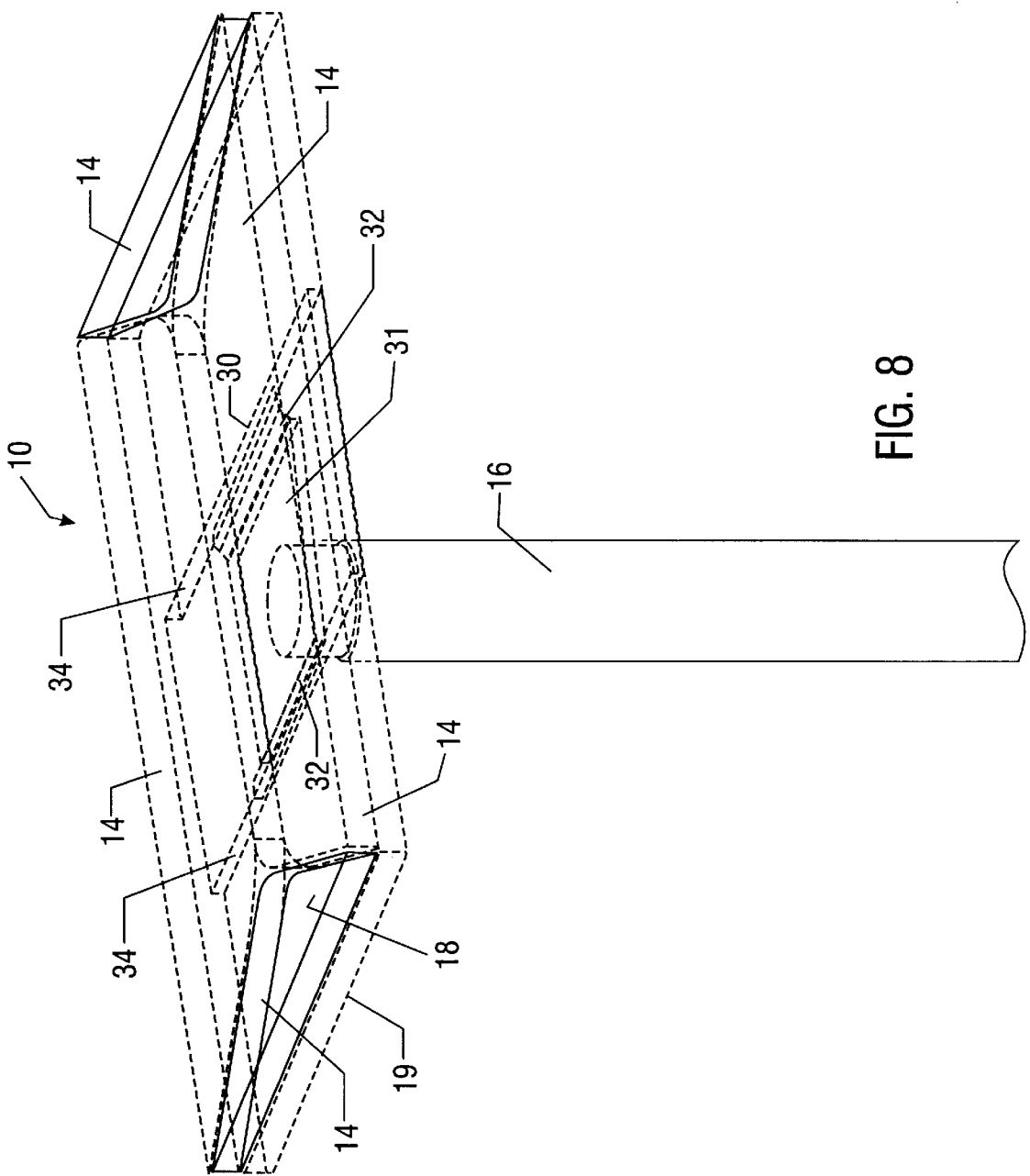
FIG. 8 is a simplified perspective view of one embodiment of the disclosed floor rising table in collapsed or stowed position.

FIG. 8 illustrates one embodiment of a floor rising table 10 in collapsed or stowed position including a tabletop 19 and opposing folding table leaves 14. A table support comprising a telescoping support pedestal 16 is provided for supporting tabletop 19. In FIG. 8 a sliding or side tracking assembly 30 comprising a dual rail mounting bracket 31 connected to the top of pedestal 16 and having dual rails 32 which are designed to be received in tracking channels 34 present in the base of tabletop 19. In this configuration, tabletop 19 may be moved in sideways or substantially perpendicular relation to the longitudinal axis of pedestal 16 by sliding channels 34 of tabletop 19 along rails 32. This feature combined with hinged tabletop side pieces 14 allows a vehicle passenger to move past the tabletop 19, with sufficient aisle clearance, for example, when the table assembly 10 is mounted in the center of the vehicle aisle. Side to side or sliding movement also allows tabletop 19 to be moved closer to a given passenger seat or set of club seats on one side of a vehicle, thereby easing access for these seats. This also allows tabletop 19 to be moved away from a given seat or set of club seats, thereby allowing a vehicle passenger to have a table within easy reach, but not interfering with leg and knee movement. Although FIG. 8 illustrates one embodiment of side tracking assembly having a rail and mating channel configuration, it will be understood with benefit of this disclosure that other embodiments of side tracking assemblies are possible including, but not limited to, drawer slides and pivot mechanisms. Furthermore, a tabletop may be movably coupled or connected to an extension assembly in any manner suitable for allowing the tabletop to move in relation to the extension assembly including, but not limited to, pivoting mechanisms and slide assemblies.

Figure 9:
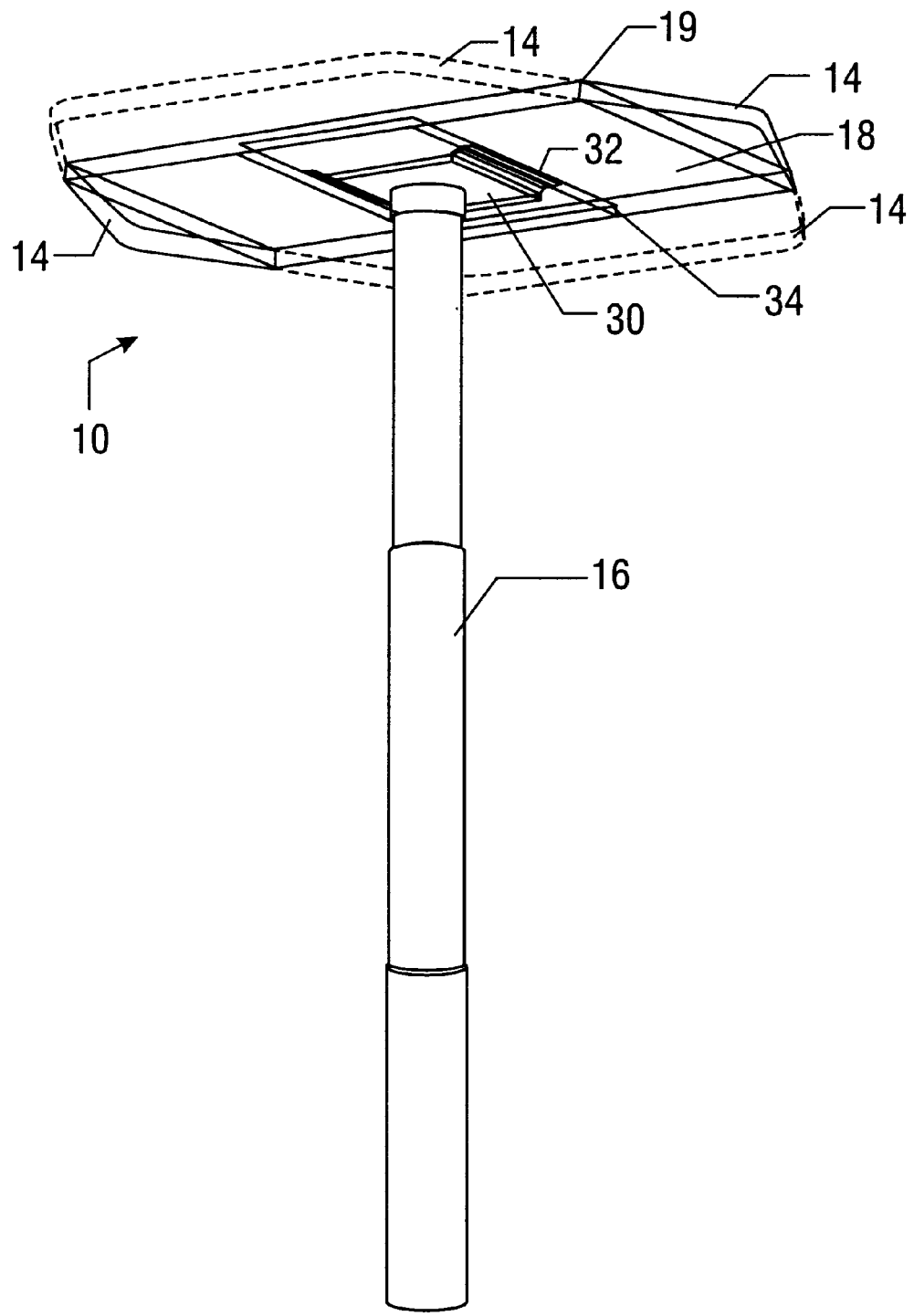
FIG. 9 is a simplified perspective view of one embodiment of the disclosed floor rising table in extended or deployed position.
Figure 10:
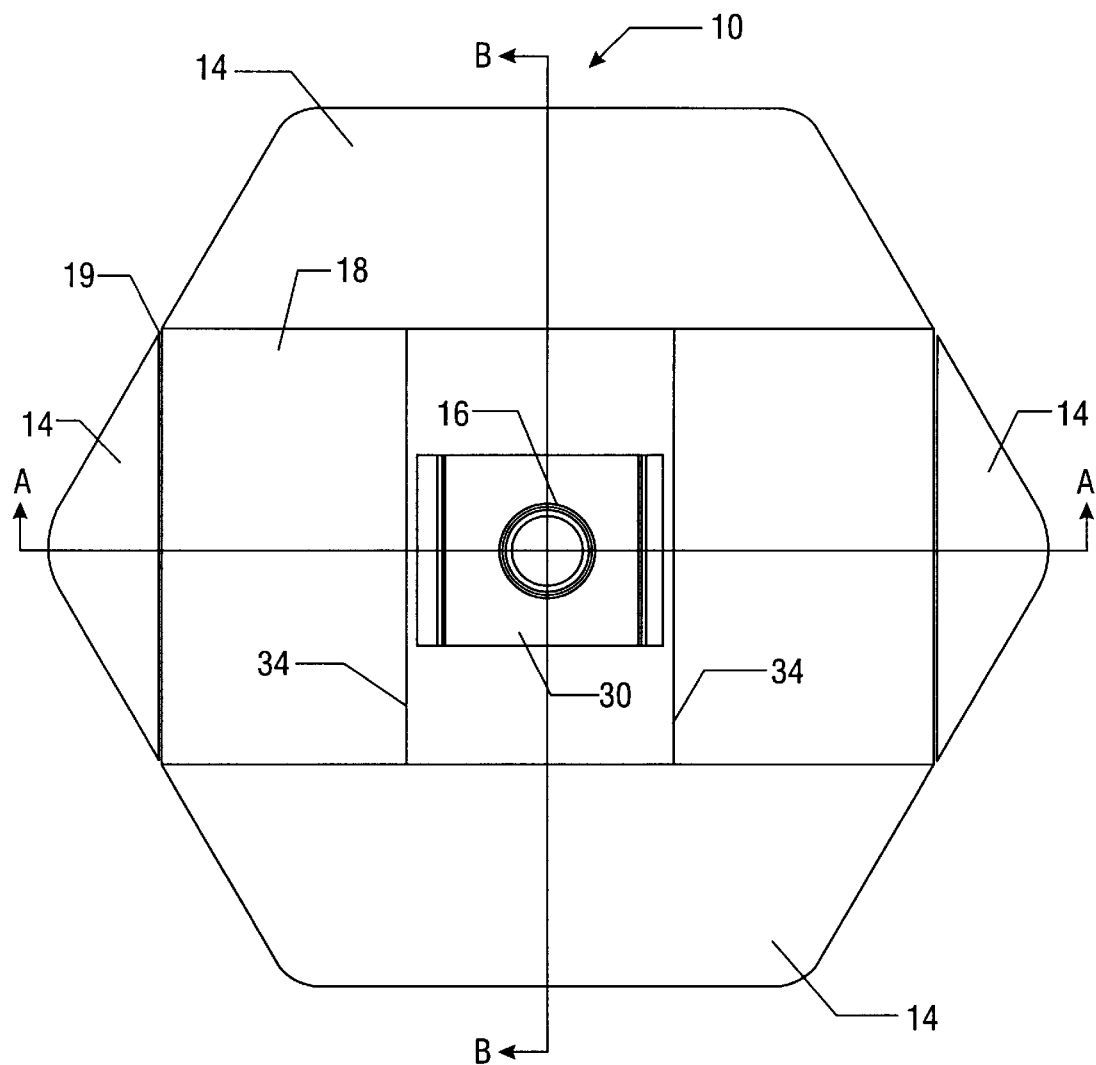
FIG. 10 is a simplified overhead view of one embodiment of the disclosed floor rising table.
Figure 11:
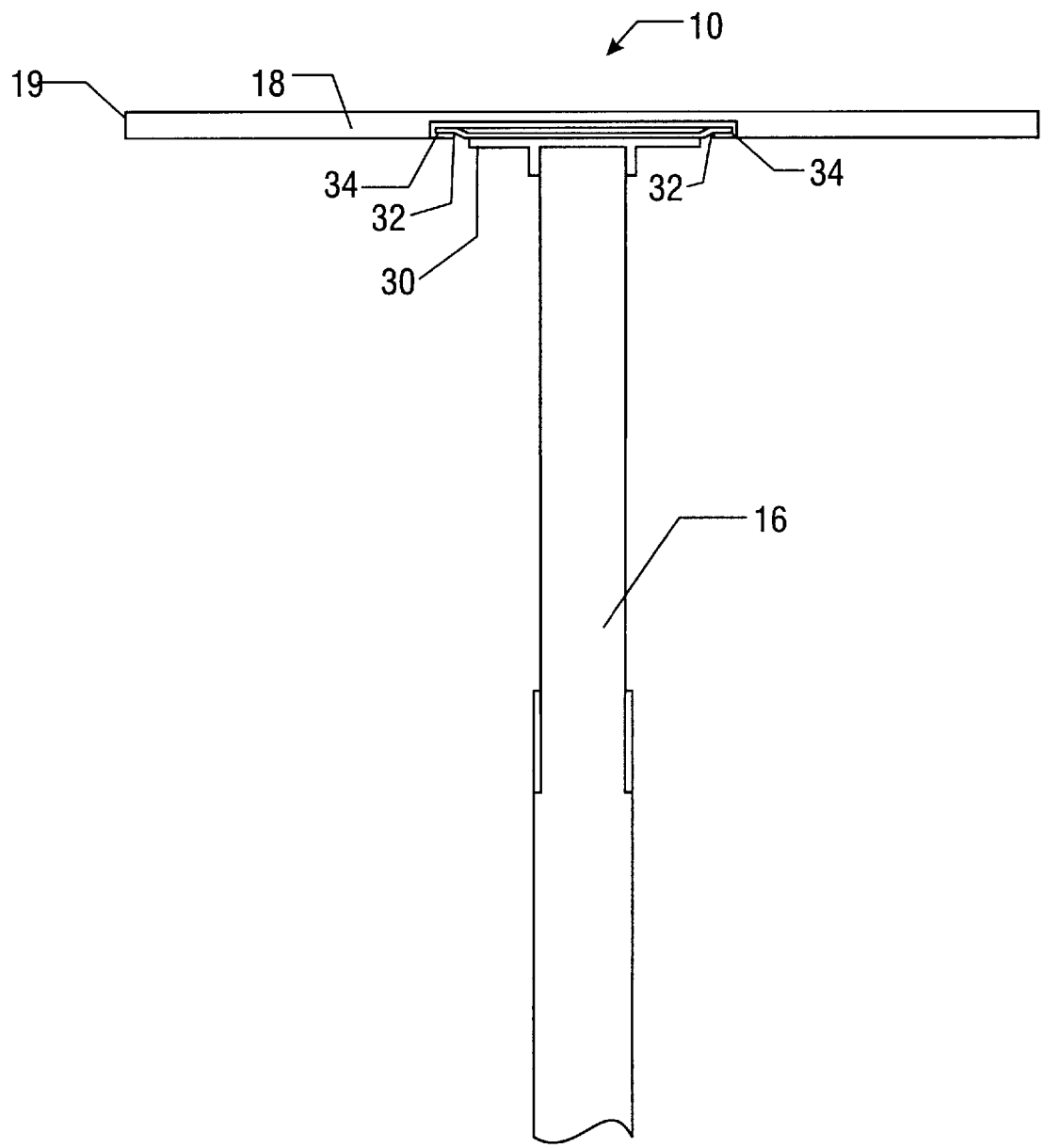
FIG. 11 is a simplified cross-sectional view of the floor rising table of FIG. 10 shown in extended or deployed position.
Figure 12:
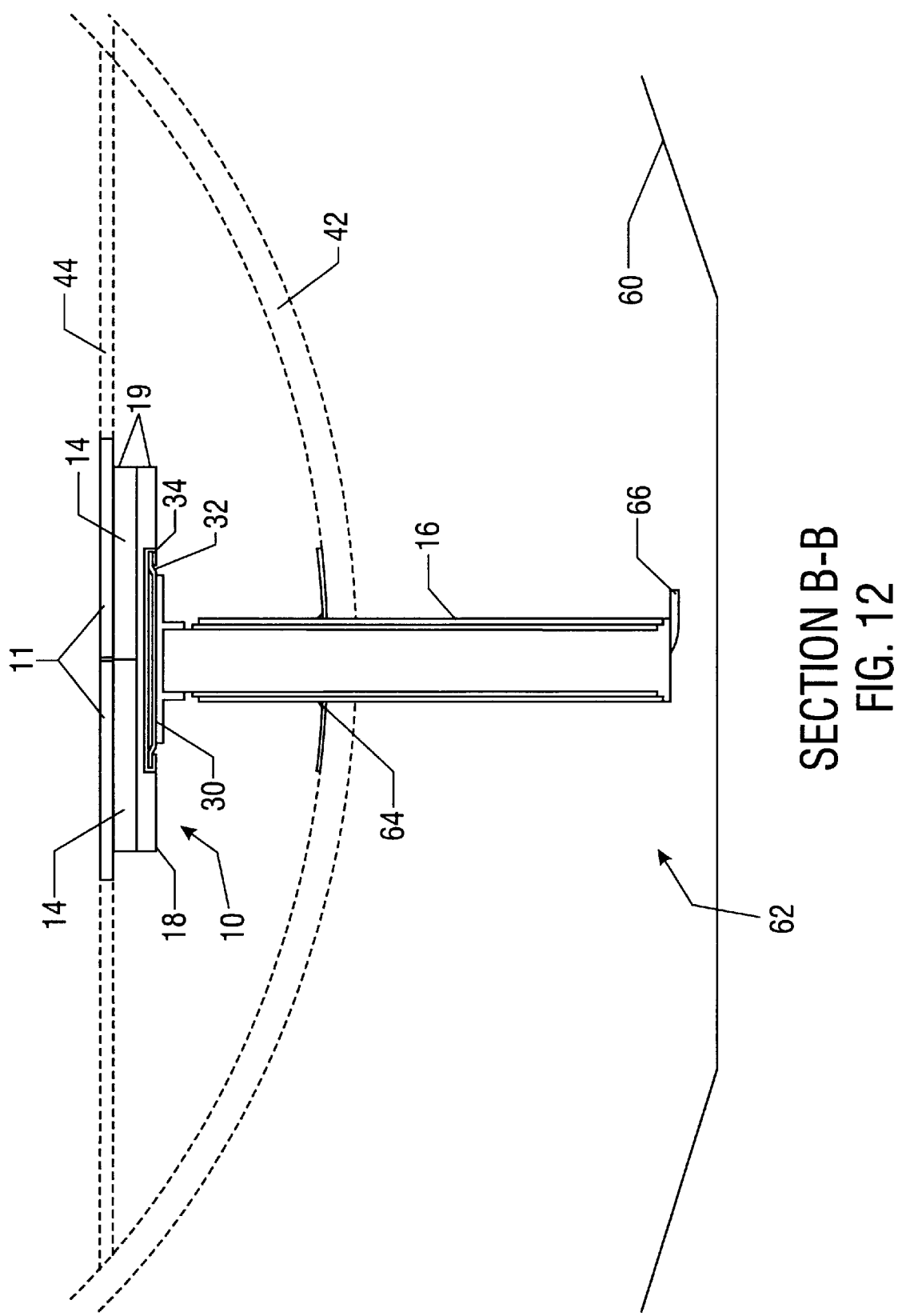
FIG. 12 is a simplified cross-sectional view of the floor rising table of FIG. 10 shown in an alternative two-leaf embodiment and in collapsed or stowed position with optional table leaves folded inward.

FIGS. 8–12 show one embodiment of the disclosed floor rising cabin table having a tabletop 19 supported by an extension assembly comprising a telescoping pedestal 16. In this regard, FIG. 10 illustrates an overhead view of the tabletop of this embodiment. FIGS. 9 and 11 illustrate perspective and side views of this embodiment of the floor rising table in extended or deployed position with optional table leaves 14 of tabletop 19 unfolded. FIG. 8 illustrates a perspective view of this embodiment of the floor rising table in stowed position. FIG. 12 illustrates a side view of this embodiment of the floor rising table in collapsed or stowed position beneath the floor of an aircraft cabin.

In FIGS. 8–12, telescoping pedestal 16 may be activated to extend pneumatically, hydraulically, mechanically, etc. For example, telescoping pedestal 16 may house a pneumatic cylinder (which may operate, for example, off pneumatic pressure supplied from an aircraft engine), a hydraulic cylinder (which may operate, for example, off an aircraft hydraulic system), or a mechanical assembly such as a spring, worm gear or screw mechanism (which may be electrically and/or mechanically activated, for example). Typically such assemblies are provided with some type of housing to isolate the active mechanism from the passenger compartment, such as telescoping pedestal 16. Any other type of housing or protective sleeve may also alternatively be employed including, but not limited to, rubber boots, expanding bellows, etc.

When employed in aircraft cabins, an extension assembly is typically a pneumatic telescoping pedestal which operates off air pressure from, for example, an aircraft engine bleeder. In this regard, the pneumatic cylinder may be activated using this or any other air supply systems known to those of skill in the art. Most typically telescoping pedestal 16 is a 3-cylinder pneumatic (or alternatively hydraulic) cylinder, in which each of the three telescoping segments are active cylinders. Benefits of the disclosed floor rising cabin table may also be realized using extension assemblies that do not have a telescoping pedestal 16. In this regard, it is only necessary that some form of extension assembly exist to support a tabletop 19. An extension assembly may be any other type of support assembly having an extendible mechanism or which is otherwise suitable for raising or extending a tabletop 19 from a stowed position to a deployed position.

Although a pneumatically operated extension assembly is typically employed, it will be understood with benefit of the present disclosure that any other method suitable for selectively raising and lowering tabletop 19 may be employed including, but not limited to, electrical, mechanical and hydraulic activated extension assemblies. Examples of suitable electrical activated mechanisms include, but are not limited to, worm or screwgear scissor assemblies. Examples of suitable hydraulic activated mechanisms include, but are not limited to, ram activated scissor assemblies. Examples of suitable mechanical activated mechanisms include, but are not limited to, screw-like mechanisms such as a motor and worm gear or screw mechanism assembly. It will be understood with benefit of the present disclosure that selection of a particular type of extension mechanism may depend on below-floor clearance in a vehicle cabin. For example, use of a worm gear or screw drive electrical mechanism typically allows a collapsed or lowered table to fit entirely within an aircraft pressure vessel, while a pneumatic mechanism typically requires a table support tube to penetrate the pressure vessel and project into the area of, for example, an underslung wing or other area which may be present beneath the pressure vessel. It will be noted that installations having extension assemblies projecting through a pressure vessel may provide table assemblies with further increased stability. It will also be noted that an extension assembly may be attached to a vehicle at a point adjacent and/or at a point beneath a cabin floor.

When a pneumatic or hydraulic actuated extension assembly is employed, a pressure release mechanism may optionally be provided to prevent damage to table components or other cabin materials, such as might occur during contact between a table assembly and passenger seating or other cabin interior components. Such pressure relief mechanisms may be designed and configured by those of skill in the art with benefit of this disclosure. In this regard, any combination of devices and/or methods suitable for activating the relief of pneumatic or hydraulic pressure may be employed including, but not limited to, motion detectors, logic circuitry, diverter valves and pressure sensing switches.

Particular advantages may be provided by different types of extension mechanisms. For example, pneumatically activated mechanisms taking pressure from an aircraft engine may be manually collapsed in engine power loss situations, such as which might occur during an emergency situation. This feature may allow a passenger to press down on a table with sufficient force to collapse the table assembly back down into the floor. For example, in one exemplary embodiment, the relationship of pneumatic pressure table support diameter is typically sized to allow about 100 pounds of weight to be supported on tabletop. Any weight applied to the table in excess of this amount then causes the table to lower. It will be understood with benefit of this disclosure that this weight limit may be varied to fit individual design requirements depending upon typical table loading and need for passenger emergency override.

FIG. 12 illustrates a floor rising cabin table 10 having an extension assembly comprising a telescoping pedestal 16. In this case, the rising cabin table is shown in collapsed or stowed position beneath the floor 44 of an aircraft cabin. As may be seen in FIG. 12, the telescoping pedestal 16 extends through the wall 42 of the aircraft cabin pressure vessel. Such an installation is made possible, for example, with low-wing aircraft configurations. For example, in the embodiment of FIG. 12, an underslung wing 60 projects about 18 inches below the constant section or wall 42 of the aircraft pressure vessel. Telescoping pedestal 16 extends through the wall 42 of the aircraft pressure vessel and into the space or hollow of the wing area 62 created between the pressure vessel wall 42 and the underside 60 of the underslung wing. A mounting plate 64 is typically provided, although not necessary, at the intersection of the pedestal and the pressure vessel. Typically mounting plate 64 is welded to telescoping pedestal 16. FIG. 12 also shows a pressure refill port 66 for supplying pneumatic or hydraulic pressure to the three pressure cylinders of telescoping pedestal 16. However, it will be understood that such a pressure port would not be necessary when an extension assembly that is electrical or mechanical is employed. Also shown in FIG. 12 are covering or closure doors 11 which cover table 10 when in its collapsed or stowed position. Typically closure doors 11 are opened by contact with table 10 as it is raised. Once tabletop 19 has cleared doors 11, doors 11 close by means of gravity (or any other suitable means, such as spring-loaded tension) about telescoping pedestal 16.

Although aircraft with underslung wings may offer substantial room beneath the aircraft fuselage or pressure vessel in which to accept a telescoping pedestal or other extension assembly, many aircraft have wings which intersect the pressure vessel and do not provide such clearance. In such aircraft, a mechanical screw or worm gear type mechanism may be installed within a telescoping pedestal 16 similar to that illustrated in FIG. 12, with the exception that the mechanism may be configured to fit entirely within the pressure vessel wall 42. Suitable mechanical or electrical extension mechanisms for such applications may be configured with benefit of this disclosure using methods known to those of skill in the art.

Figure 15:
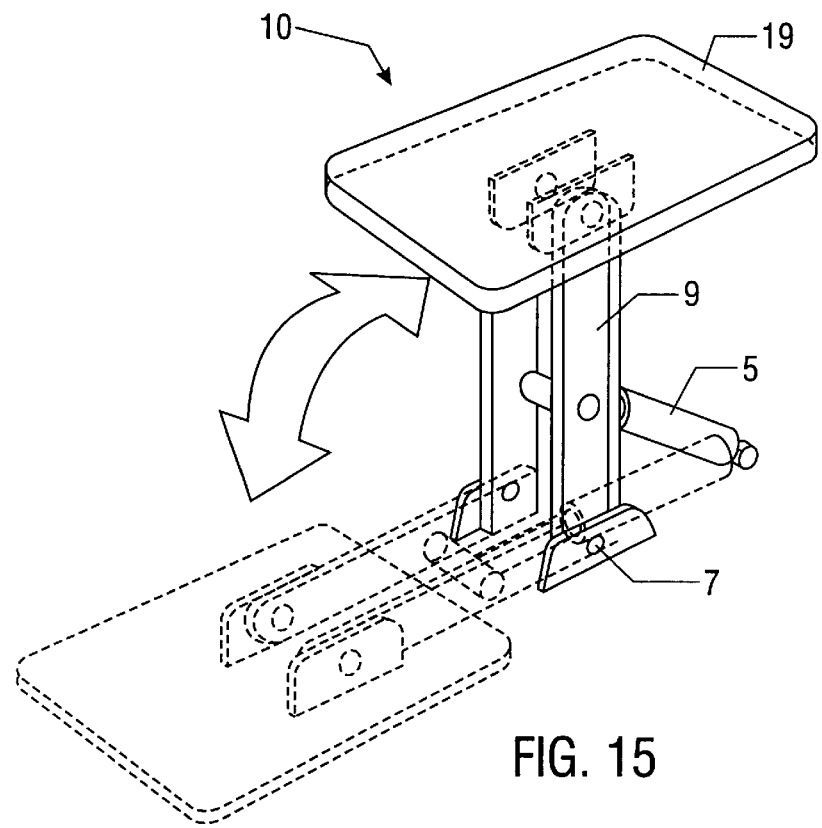
FIG. 15 shows a simplified perspective view of one embodiment of the disclosed floor rising table in alternative stowed and extended positions.
Figure 16:
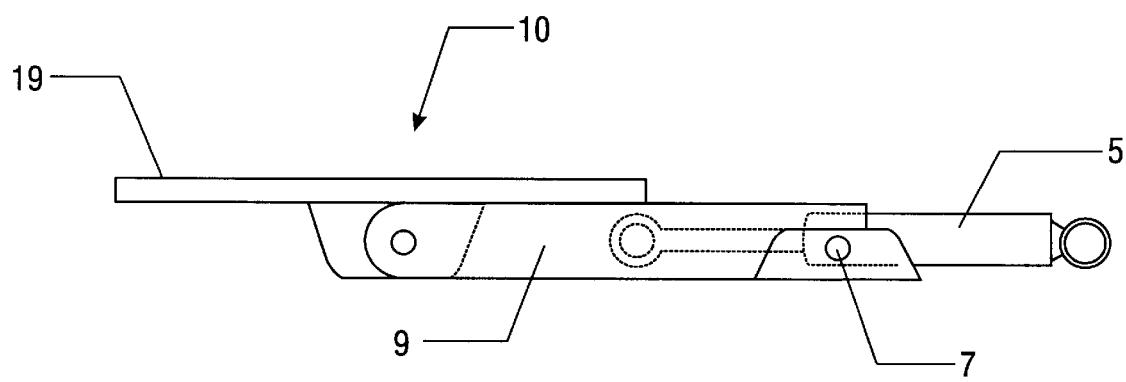
FIG. 16 is a simplified side view of the floor rising table of FIG. 15 in stowed position.
Figure 17:
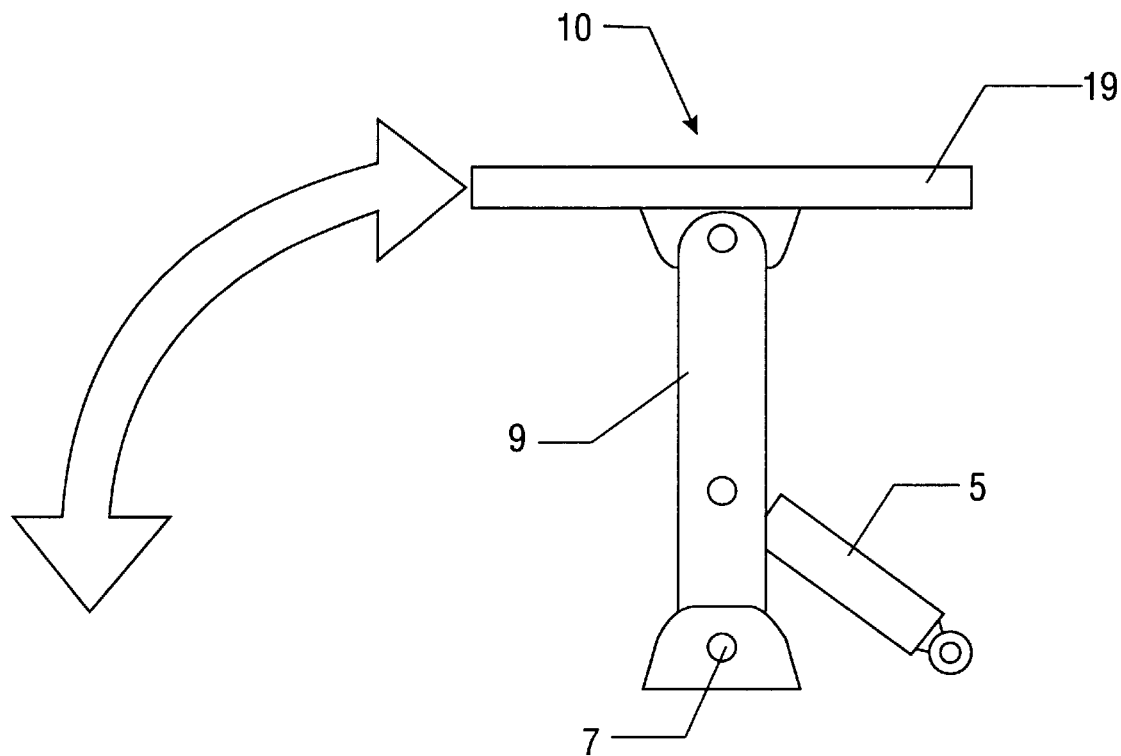
FIG. 17 is a simplified side view of the floor rising table of FIG. 15 in extended position.

FIGS. 15–17 illustrate a further embodiment suitable for use, for example, when under floor clearance is limited. As illustrated in FIG. 15, a floor rising table 10 may be configured with an extension assembly comprising one or more support members 9 hingeably or rotatably coupled at one end to stationary floor mounts 7. An extension assembly actuator 5 (such as a hydraulic cylinder, pneumatic cylinder, worm gear shaft, etc.) is typically employed to move floor rising table 10 between stowed and extended positions as shown in FIGS. 16 and 17, respectively. Although the embodiment of floor rising table 10 pictured in FIGS. 16–17 is shown with an automatic actuator 5, it will be understood that such a table may also be configured for manual operation with or without the use of an actuator 5. Although not pictured, the embodiment of floor rising table 10 illustrated in FIGS. 15–17 may be provided with table leaves, side tracking, and/or any other features described or illustrated elsewhere herein for use with other embodiments of the disclosed floor rising cabin table. Furthermore, although not necessary, the embodiment of floor rising cabin table 10 illustrated in FIGS. 15–17 is typically configured to reside within a recess in the floor of a vehicle cabin, and may be covered by one or more closure doors which may hingeably rotate or slide out of the way such that the table may be deployed in a manner similar to that described or illustrated elsewhere herein for closure doors employed with other embodiments of the floor rising cabin table.

Figure 13:
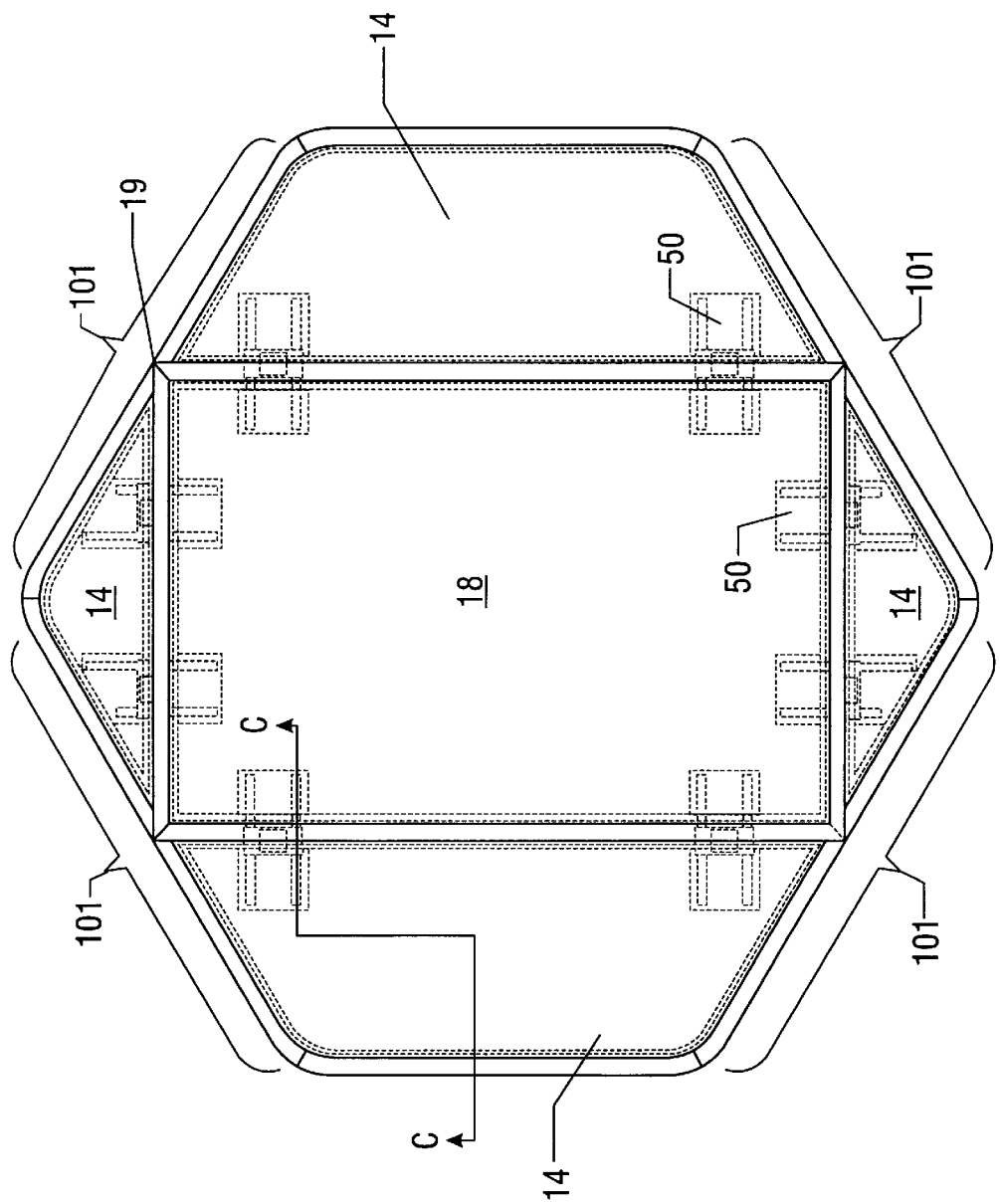
FIG. 13 is a simplified overhead view of one embodiment of the disclosed floor rising table.

FIG. 13 illustrates just one of many possible embodiments of tabletop 19 having a rectangular shape and four table leaves 14. In this embodiment it may be seen that two hinge mechanisms 50 are provided to foldably support or foldably attach each table leaf 14 to center section 18. Advantageously, all four table leaves may be unfolded to create a relatively large working surface having angled access for, for example, each of four seats of a club arrangement. By folding inwardly the four table leaves 14, the dimensions of table 10 are transformed so as to provide adequate clearance to lower table 10 between opposing passenger seats and into a suitable small storage space or stowing space for storage beneath the floor. In one typical exemplary embodiment, a rectangular shape tabletop 19 as illustrated in FIG. 13 is positioned in a vehicle cabin such that the long axis or major length of the rectangular table shape of center section 18 is aligned with the center line of the vehicle cabin and positioned substantially in the center of four vehicle seats arranged in club configuration. Advantageously, such an installation allows a convenient tabletop shape (as shown in FIG. 13) to be formed when table leaves 14 are unfolded, thus allowing ample and convenient access by each passenger in one of the four pivotable club seats to each of the four long sides 101 of tabletop 19.

Figure 14:
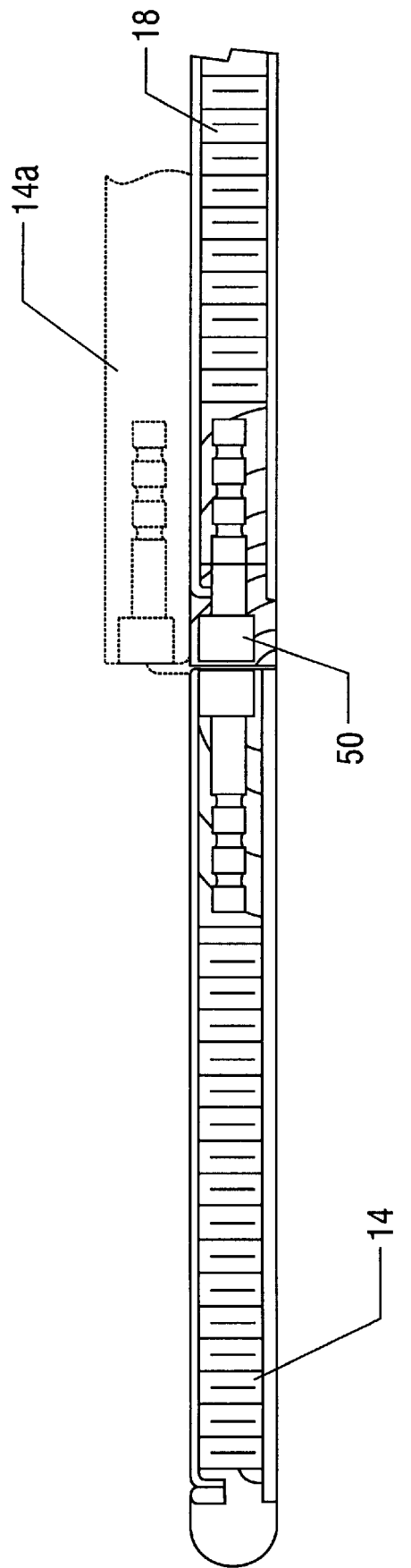
FIG. 14 is a simplified and partial sectional view of the floor rising table of FIG. 13.

FIG. 14 illustrates a partial side cross-sectional view of tabletop 19, including center section 18, one table leaf 14 and connecting hinge mechanism 50. In FIG. 14 table leaf 14 is illustrated in unfolded position. The folded position for table leaf 14 is indicated by outline 14a. In the embodiment of FIG. 8, hinge mechanism 50 is a morgan-type hinge. However, it will be understood with benefit of this disclosure that any other suitable hinge mechanism or other mechanism known in the art may be utilized for foldably securing table leaves 14 to a tabletop 19 including, but not limited to, piano hinges, conventional hinges, etc.

In one most typical aircraft cabin embodiment, a floor rising table is employed in the cabin of an aircraft having a composite fuselage. In this embodiment, table assembly is typically designed to be mounted to the fuselage. An electrical ground is typically provided to prevent likelihood of a lightning strike being transmitted to an aircraft passenger. A source of bleed air from the aircraft engines is used to assist in the raising of the table assembly. Typically this is a 30 psi supply. However, higher and lower pressures may be provided as dictated by design requirements. In addition, in the most typical embodiment a table assembly is designed to withstand a load of about 100 lbs. applied to the edge of the tabletop when the top is in its extended or deployed position.

Figure 18:
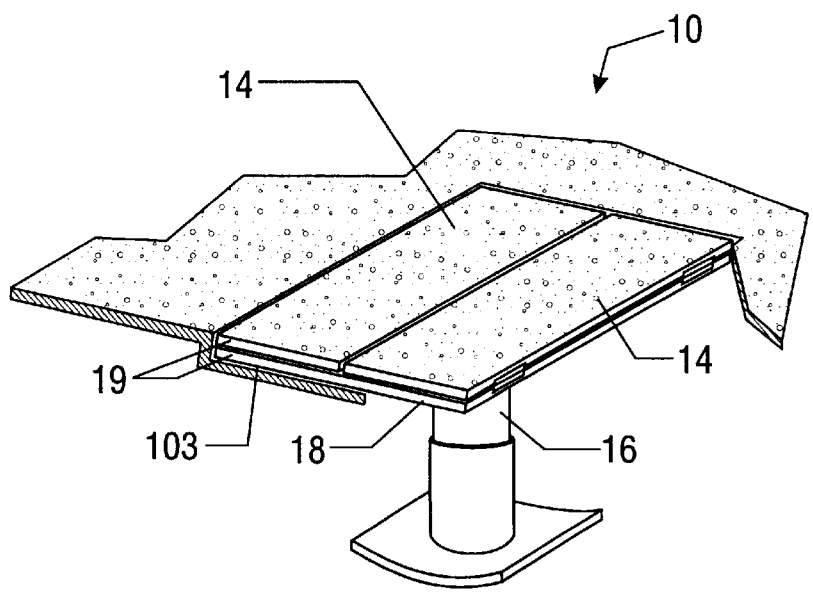
FIG. 18 is a simplified perspective view of one embodiment of the disclosed floor rising table having no closure doors and shown in collapsed or stowed position.
Figure 19:
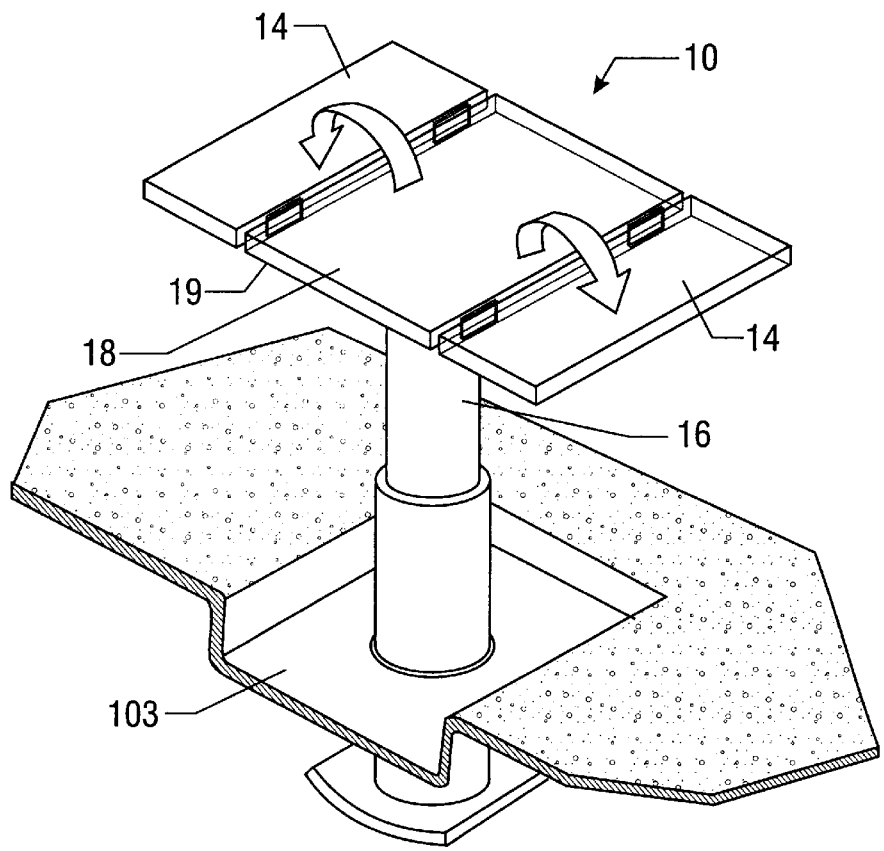
FIG. 19 is a simplified perspective view of one embodiment of the disclosed floor rising table having no closure doors and shown in extended or deployed position.

FIGS. 18 and 19 illustrate another possible embodiment of a rising cabin table 10 in which no closure doors 11 are required. In this embodiment, the underside of table leaves 14 form the surface of the floor when the tabletop 19 is in stowed position as shown in FIG. 18. Upon deployment of table 10 table leaves 14 may be opened so that the floor walking surface is now on the underside of the table leaves and a clean tabletop surface presented to the passenger. As shown in FIG. 18, tabletop 19 may be stowed in recessed area 103. Although not pictured, a tabletop 19 without table leaves 14 or with integral side pieces or sliding table leaves, may also be employed with a non-closure door embodiment such as that illustrated in FIGS. 18 and 19. In such cases, however, the working surface of the extended tabletop 18 typically forms the walking surface of the floor when table 10 is in stowed position.

Figure 20:
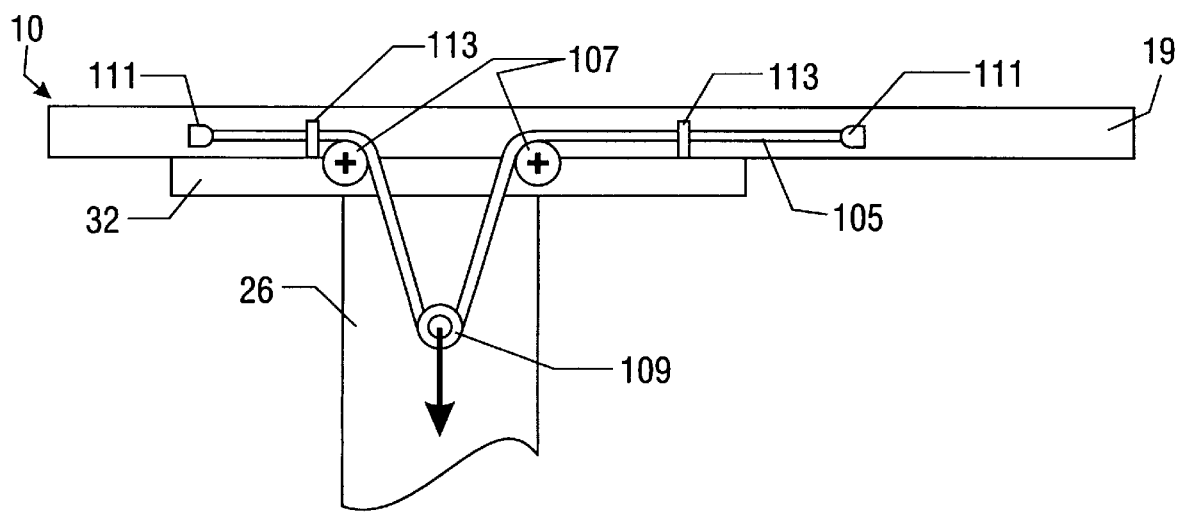
FIG. 20 is a simplified cross-sectional view of one embodiment of the disclosed floor rising table in extended or deployed position and configured with an automatic centering mechanism.

FIG. 20 illustrates an optional automatic centering mechanism which may be employed with embodiments of the disclosed floor rising cabin table 10 when configured with the side tracking assembly as described elsewhere herein. In FIG. 20, the automatic centering mechanism typically include cable 105, guide pulleys 107, tension pulley 109, cable stops 113, and fixed cable ends 111. These mechanisms may be mounted, for example, on the surface of the underside of tabletop 19 and/or may be partially or completely recessed within mechanism. In operation, the optional automatic centering mechanism acts to move or slide tabletop 19 to center position over pedestal 16 so as to dispose it in position for stowing beneath the cabin floor. Advantageously, using such an optional automatic centering device helps ensure that tabletop 19 does not contact objects within the cabin such as vehicle seats during automated lowering. To accomplish centering using the pictured embodiment of automatic centering mechanism, a downward force is applied to tension pulley 109 by, for example, a spring, motor, hydraulic or pneumatic cylinder, worm gear, solenoid, or other suitable device known in the art. This downward force is typically initiated when a switch or other command is given to an automated extension assembly to lower the table. Downward force on tension pulley 109 pulls cable 105 across guide pulleys 107 and thus applies an inward force or pull on fixed cable ends 111, thus causing tabletop 19 to be centered over pedestal 16. Cable stops 113 act to prevent fixed cable ends 111 from contacting or overrunning guide pulleys 107. When both fixed ends 111 contact cable stops 113 the tabletop 19 is substantially centered. Although one embodiment of an automatic table centering mechanism is illustrated in FIG. 20, it will be understood with benefit of this disclosure that any other mechanism suitable for centering a tabletop may be employed including, for example, actuating devices employed within a pedestal 16 and/or tabletop 19 to directly actuate and center the table. Suitable actuator devices include, but are not limited to, worm gears, pneumatic or hydraulic cylinders, electric solenoids, etc. Furthermore, any other method or mechanism known in the art may be used for automatically centering the tabletop 19 with benefit of this disclosure.

Components of a rising cabin table may be comprised of any materials known in the art suitable for tabletop and related components and for demands of particular installations including trim material, such as rounded hardwood trim, provided on the edge of a tabletop to minimize or prevent damage caused by contact with chairs or other interior components during extension of the table. In many installations, lightweight materials will be most desirable, although not necessary. For example, a tabletop may be comprised of a laminated composite material designed to be lightweight but yet deliver high strength and suitable appearance. In one embodiment, a tabletop includes a high gloss covered wooden veneer with wooden and/or metal wraparound material. The tabletop may be configured with any suitable tabletop surface including, but not limited to, a hard gloss surface, a leather writing surface, etc.. If so desired, an extension assembly may be constructed of lightweight state-of-the-art materials such as nomex honeycomb with fiberglass pre-preg skins. In one embodiment, a telescoping pedestal constructed of aluminum tubing may be employed. In a most typical embodiment, closure doors or covering panels may be covered with optional carpet and, if desired, a suitable means or material to prevent carpet fraying, such as carpet binding or serging.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the apparatus may be utilized in various combinations and/or independently. Thus the invention is not limited to only those combinations shown herein, but rather may include other combinations.

What is claimed is:

1. A floor rising table assembly, comprising:

a tabletop; and an extension assembly coupled to said tabletop;

wherein said extension assembly is adjustable between a stowed position and an extended position so that said tabletop is disposed beneath or adjacent an aircraft cabin floor when said extension assembly is in said stowed position, and so that said tabletop is disposed at a greater distance above said aircraft cabin floor when said extension assembly is in said extended position than when said tabletop is in said stowed position.

2. The table assembly of claim 1, wherein said tabletop comprises a center section and at least one side piece, said side piece being extendably attached to said center section.

3. The table assembly of claim 1, wherein said tabletop is movably coupled to said extension assembly.

4. The table assembly of claim 1, wherein said extension assembly is an automated extension mechanism.

5. An aircraft-mounted rising table assembly, comprising:

a tabletop; and an extension assembly coupled to said tabletop, said extension assembly having a first end and a second end, said first end of said extension assembly being coupled to said tabletop, and said second end of said extension assembly being coupled to said aircraft at a point adjacent or beneath a floor of said aircraft;

wherein said extension assembly is adjustable between a stowed position and an extended position so that said tabletop is disposed beneath or adjacent said aircraft floor when said extension assembly is in said stowed position, and so that said tabletop is disposed at a greater distance above said aircraft floor when said extension assembly is in said extended position than when said tabletop is in said stowed position.

6. The table assembly of claims 5, wherein said aircraft floor has an opening adapted to receive said tabletop; wherein said tabletop is adapted to be disposed beneath said floor when said extension assembly is in said stowed position; and wherein an upper surface of said tabletop is disposed adjacent to, and in substantially the same plane as, said aircraft floor when said extension assembly is in said stowed position, such that said tabletop upper surface is adapted to serve as a portion of said floor when said extension assembly is in said stowed position.

7. The table assembly of claim 5, wherein said aircraft floor has an opening adapted to receive said tabletop, and wherein said tabletop is adapted to be disposed beneath said floor when said extension assembly is in said stowed position; and further comprising at least one closure door movable in relation to said aircraft floor, said closure door adapted to cover said opening in said aircraft floor when said extension assembly is in said respective stowed and extended positions, and wherein said closure door is further adapted to open to allow said tabletop to pass through said opening in said aircraft floor when said extension assembly is in a position intermediate between said extended and stowed positions.

8. The table assembly of claim 7, wherein said closure door is further adapted to close around said extension assembly after said tabletop has passed through said opening in said aircraft floor; and wherein a pedestal opening is defined in said closure door, said pedestal opening being located in said closure door and having shape and dimensions complementary to said extension assembly such that said extension assembly may be received in said pedestal opening when said extension assembly is in extended position and said closure door is closed.

9. The table assembly of claim 7, wherein said at least one closure door is hingeably connected to said aircraft floor and adapted to swing outwardly and upwardly to allow said tabletop to pass through said opening in said aircraft floor when said extension assembly is in a position intermediate between said extended and stowed positions.

10. The table assembly of claim 7, wherein said tabletop comprises a center section and at least one side piece, said side piece being extendably attached to said center section.

11. The table assembly of claim 10, wherein said at least one tabletop side piece is movable between a first position in substantially cantilevered or extended relation with said tabletop center section, and a second position in substantially overlapping or integral relation with said tabletop center section; and wherein said tabletop has dimensions complementary to said opening in said aircraft floor so that said tabletop may be received through said opening when said at least one tabletop side piece is in said second position.

12. The table assembly of claim 7, wherein said extension assembly adjustment and said closure door movement is accomplished automatically.

13. The table assembly of claim 5, wherein said tabletop is movably coupled to said extension assembly.

14. The table assembly of claim 13, further comprising an automatic centering mechanism adapted to automatically center said tabletop relative to said extension assembly just prior to movement of said extension assembly from said extended position to said stowed position.

15. The table assembly of claim 5, wherein said extension assembly is an automated extension mechanism.

16. An aircraft cabin rising table assembly, comprising:

a tabletop center section having an upper surface, a lower surface, and at least one edge;

at least one tabletop side piece, said side piece having an upper surface, a lower surface, and at least one edge hingeably attached to said at least one edge of said center section; and an extendible support coupled between said tabletop center section and said aircraft, said extendible support having a first end, a second end, and a longitudinal axis, said first end of said extendible support being slidably coupled to said lower surface of said tabletop center section, and said second end of said extendible support being disposed at a point beneath a floor of said aircraft cabin;

wherein said extendible support is adjustable between a stowed position and an extended position so that said tabletop center section and said at least one tabletop side piece are disposed beneath said cabin floor when said extendible support is in said stowed position, and so that said tabletop center section and at least one tabletop side piece are disposed at a distance above said floor when said extendible support is in said extended position;

wherein said at least one tabletop side piece is hingeably movable between a first position in cantilevered relation with said at least one edge of said tabletop center section, and a second position in substantially overlapping relation with said upper or lower surfaces of said tabletop center section;

wherein said cabin floor has an opening adapted to receive said tabletop center and side piece through said cabin floor, and wherein said tabletop center section has dimensions complementary to said opening in said cabin floor so that said tabletop center section and tabletop side piece may be received through said opening when said at least one tabletop side piece is in said second position, and wherein said tabletop center section and tabletop side piece are adapted to be disposed beneath said floor when said extendible support is in said stowed position; and further comprising at least one closure door movable in relation to said cabin floor, said closure door adapted to cover said opening in said cabin floor when said extendible support is in said respective stowed and extended positions, and wherein said closure door is further adapted to open to allow said tabletop center section and tabletop side piece to pass through said opening in said cabin floor when said extendible support is in a position intermediate between said extended and stowed positions; and wherein said tabletop center section is slidably adjustable in relation to said extendible support in a direction substantially perpendicular to said longitudinal axis of said extendible support.

17. The table assembly of claim 16, wherein said closure door is further adapted to close around said extendible support after said tabletop center section and tabletop side piece has passed through said opening in said cabin floor; wherein a pedestal opening is defined in said closure door, said pedestal opening being located in said closure door and having shape and dimensions complementary to said extendible support such that said extendible support may be received in said pedestal opening when said extendible support is in extended position and said closure door is closed; and further comprising a cutout section having shape and dimensions complementary to said pedestal opening such that said cutout section may be received in said pedestal opening; said cutout section being movably connected to said closure door and adapted to be received in said pedestal opening when said extendible support is in said stowed position and adapted to be removed from said pedestal opening when said extendible support is in extended position and said closure door is closed.

18. The table assembly of claim 16, wherein said aircraft cabin has at least two rows of exterior passenger seats separated by a center aisle, wherein said second end of said opening and said extendible support are positioned at a location between said at least two rows of exterior passenger seats and coincident with said center aisle.

19. The table assembly of claim 18, wherein said tabletop center section is slidably adjustable toward each of said exterior rows of passenger seats, and in a direction substantially perpendicular to the longitudinal axis of said aircraft cabin.

20. The table assembly of claim 16, wherein said tabletop center section and at least one tabletop side piece together comprise a tabletop, and wherein said extendible support is positioned and configured such that when said extendible support is in said extended position, said upper surface of said tabletop is disposed in a complementary manner with at least one deployed sidewall stowable cabin table having an upper surface to form a substantially continuous tabletop upper surface.

21. The table assembly of claim 16, wherein said extendible support is an automated extension mechanism.

22. The table assembly of claim 21, further comprising an automatic centering mechanism adapted to automatically and slidably adjust said tabletop center section to a substantially centered position relative to said extendible support just prior to automatic movement of said automated extension mechanism from said extended position to said stowed position.

23. The table assembly of claim 21, wherein said aircraft has a pressure vessel wall surrounding said cabin, and wherein said second end of said extendible support is disposed at a point between said cabin floor and said pressure vessel wall.

24. The table assembly of claim 21, wherein said aircraft has a pressure vessel wall surrounding said cabin and an underslung wing area disposed beneath said cabin, and wherein said extendible support extends through said pressure vessel wall so that said second end of said extendible support is disposed at a point in said underslung wing area.

25. The table assembly of claim 24, wherein said automated extension mechanism is a pneumatic actuated cylinder.

26. An aircraft cabin floor rising table assembly, comprising:
 a tabletop; and
 an extension assembly coupled to said tabletop;
 wherein said extension assembly is adjustable between a stowed position and an extended position so that said tabletop is disposed beneath an aircraft cabin floor surface when said extension assembly is in said stowed position, and so that said tabletop is disposed at a greater distance above said aircraft cabin floor surface when said extension assembly is in said extended position than when said tabletop is in said stowed position;
 wherein said aircraft cabin floor surface has an opening adapted to receive said tabletop, and wherein said tabletop is adapted to be disposed beneath said aircraft cabin floor surface when said extension assembly is in said stowed position; and
 further comprising at least one closure door movable in relation to said aircraft cabin floor surface, said closure door adapted to cover said opening in said aircraft cabin floor surface when said extension assembly is in said respective stowed and extended positions, and wherein said closure door is further adapted to open to allow said tabletop to pass through said opening in said aircraft cabin floor surface when said extension assembly is in a position intermediate between said extended and stowed positions.

27. The table assembly of claim 26, wherein said at least one closure door is hingeably connected to said floor and adapted to swing outwardly and upwardly to allow said tabletop to pass through said opening in said floor when said extension assembly is in a position intermediate between said extended and stowed positions.

28. A vehicle-mounted rising table assembly, comprising:
 a tabletop; and
 an extension assembly coupled to said tabletop, said extension assembly having a first end and a second end, said first end of said extension assembly being coupled to said tabletop, and said second end of said extension assembly being coupled to said vehicle at a point adjacent or beneath a floor of said vehicle;
 wherein said extension assembly is adjustable between a stowed position and an extended position so that said tabletop is disposed beneath or adjacent said floor when said extension assembly is in said stowed position, and so that said tabletop is disposed at a greater distance above said floor when said extension assembly is in said extended position than when said tabletop is in said stowed position;
 wherein said tabletop is moveably coupled to said extension assembly; and
 wherein said table assembly further comprises an automatic centering mechanism adapted to automatically center said tabletop relative to said extension assembly just prior to movement of said extension assembly from said extended position to said stowed position.

29. The table assembly of claim 28, wherein said vehicle is an aircraft and said vehicle floor is an aircraft cabin floor.

* * * * *